US012615534B2

(12) United States Patent
Kang et al.

(10) Patent No.: US 12,615,534 B2
(45) Date of Patent: Apr. 28, 2026

(54) METHOD AND DEVICE FOR MANAGING CONNECTION MODE MOBILITY OF REMOTE TERMINAL THROUGH RELAY TERMINAL IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 18/262,367

(22) PCT Filed: Jan. 17, 2022

(86) PCT No.: PCT/KR2022/000839
§ 371 (c)(1),
(2) Date: Jul. 20, 2023

(87) PCT Pub. No.: WO2022/158807
PCT Pub. Date: Jul. 28, 2022

(65) Prior Publication Data
US 2024/0214848 A1 Jun. 27, 2024

(30) Foreign Application Priority Data

Jan. 20, 2021 (KR) ........................ 10-2021-0007814
Nov. 2, 2021 (KR) ........................ 10-2021-0148864

(51) Int. Cl.
*H04W 24/10* (2009.01)
*H04W 36/08* (2009.01)
(Continued)

(52) U.S. Cl.
CPC ........... *H04W 24/10* (2013.01); *H04W 36/08* (2013.01); *H04W 88/04* (2013.01); *H04W 92/18* (2013.01)

(58) Field of Classification Search
CPC ..... H04W 24/10; H04W 36/08; H04W 88/04; H04W 92/18; H04W 36/0058; H04W 36/00; H04W 40/22; H04W 40/36
See application file for complete search history.

(56) References Cited

U.S. PATENT DOCUMENTS

2007/0086387 A1 4/2007 Kang et al.
2007/0086388 A1 4/2007 Kang et al.
(Continued)

FOREIGN PATENT DOCUMENTS

EP 1775983 A1 4/2007
EP 1775984 A2 4/2007
KR 10-0872413 B1 12/2008

OTHER PUBLICATIONS

International Search Report and Written Opinion of the International Searching Authority dated Mar. 25, 2022, in connection with International Application No. PCT/KR2022/000839, 8 pages.
(Continued)

*Primary Examiner* — Abdullahi Ahmed

(57) ABSTRACT

The present disclosure relates to: a communication technique merging IoT technology with a 5th generation (5G) or 6th generation (6G) or pre-5G communication system for supporting a data transmission rate higher than that of a 4th generation (4G) communication system, such as long term evolution (LTE); and a system therefor. The present disclosure can be applied to intelligent services (for example, smart homes, smart buildings, smart cities, smart cars or connected cars, healthcare, digital education, retail businesses, security- and safety-related services, and the like) on the basis of 5G communication technology and IoT-related
(Continued)

technology. According to various embodiments of the present disclosure, provided are a method and a device for processing connection mode mobility of a terminal if a terminal can access a network through a direct connection with a base station or a connection with the base station through a sidelink relay in a wireless communication system.

20 Claims, 18 Drawing Sheets

(51) Int. Cl.
  *H04W 88/04* (2009.01)
  *H04W 92/18* (2009.01)

(56) References Cited

U.S. PATENT DOCUMENTS

| | | | |
|---|---|---|---|
| 2007/0123292 A1 | 5/2007 | Kang et al. | |
| 2022/0103997 A1* | 3/2022 | Kang | H04W 8/005 |
| 2023/0309009 A1* | 9/2023 | Back | H04W 48/20 |
| 2023/0388771 A1* | 11/2023 | Back | H04W 8/005 |
| 2023/0413089 A1* | 12/2023 | Wang | H04W 88/04 |
| 2024/0007922 A1* | 1/2024 | Cheng | H04W 40/12 |
| 2024/0214848 A1* | 6/2024 | Kang | H04W 40/22 |
| 2024/0430777 A1* | 12/2024 | Hoang | H04W 88/04 |

OTHER PUBLICATIONS

Intel Corporation, "Further details on Service Continuity for Relaying," R2-2009271, 3GPP TSG RAN WG2 Meeting #112e, e-Meeting, Nov. 2-13, 2020, 7 pages.

Intel Corporation, "Inter-gNB Path Switching for L2 U2N Relay," R2-2101300, 3GPP TSG RAN WG2 Meeting #113e, e-Meeting, Jan. 25-Feb. 5, 2020, 11 pages.

Nokia, et al., "UE-to-Nwk Relay Discovery and (Re)selection for Path Switching," R2-2101211, 3GPP TSG-RAN WG2 Meeting #113 Electronic, Jan. 25-Feb. 5, 2021, 4 pages.

Oppo, "Left issues on Scenarios for sidelink Relay," R2-2008779, 3GPP TSG-RAN WG2 #112-e, E-meeting, Nov. 2020, 2 pages.

Oppo (rapporteur), "Summary of [Post111-e][623][Relay] Remaining issues on relay discovery," R2-2010661 revision of R2-2008815, 3GPP TSG-RAN WG2 #111-e, E-meeting, Nov. 2020, 39 pages.

* cited by examiner

FIG. 15

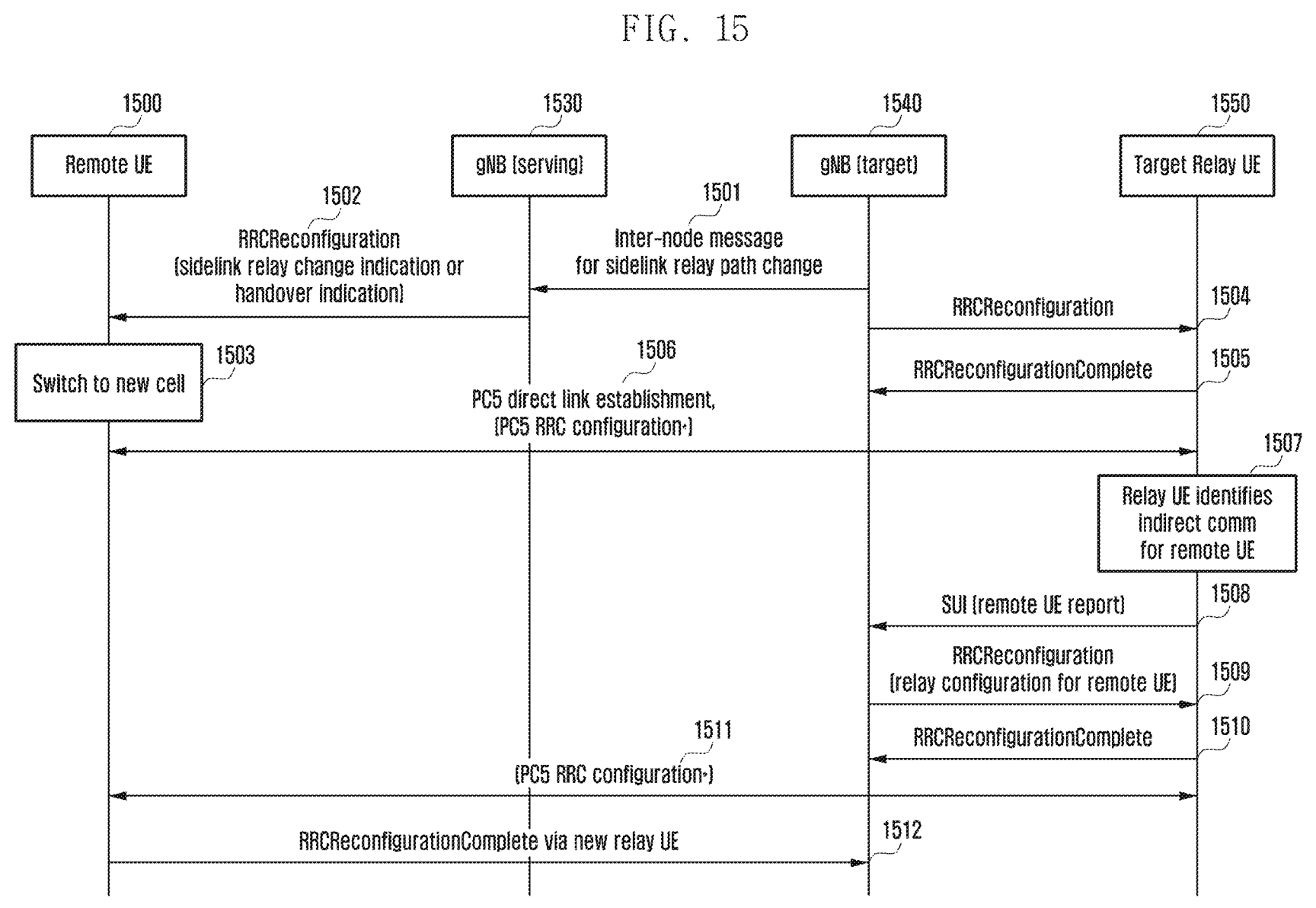

Remote UE 1500 gNB (serving) 1530 gNB (target) 1540

Target Relay UE 1550

Inter-node message for sidelink relay path change 1501

RRCReconfiguration (sidelink relay change indication or handover indication) 1502

Switch to new cell 1503

PC5 direct link establishment, (PC5 RRC configuration-) 1506

RRCReconfiguration 1504

RRCReconfigurationComplete 1505

Relay UE identifies indirect comm for remote UE 1507

SUI (remote UE report) 1508

RRCReconfiguration (relay configuration for remote UE) 1509

RRCReconfigurationComplete 1510

(PC5 RRC configuration-) 1511

RRCReconfigurationComplete via new relay UE 1512

METHOD AND DEVICE FOR MANAGING CONNECTION MODE MOBILITY OF REMOTE TERMINAL THROUGH RELAY TERMINAL IN WIRELESS COMMUNICATION SYSTEM

TECHNICAL FIELD

The disclosure relates to a wireless communication system. More specifically, it relates to a method and apparatus for processing connection mode mobility of a terminal establishing a connection to a base station based on a sidelink with a relay terminal in a wireless communication system.

BACKGROUND ART

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (e.g., service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

DISCLOSURE

Technical Problem

The disclosure may provide a method and device for processing the mobility of a connected mode (RRC_CONNECTED STATE) of a terminal in a wireless communication system when the terminal is connected to a base station through a sidelink relay or when the terminal is directly connected to the base station. In a general communication system in which a terminal is directly connected to a base station, the mobility of a connected mode of the terminal may be supported as a handover procedure. In a sidelink relay system in which a terminal supports connection with a base station through a sidelink relay, the mobility of a connected mode of the terminal may be supported as a handover and path change procedure. The disclosure may provide a method and device for processing configuration information related to a sidelink relay in a wireless communication system and a procedure of changing a terminal path when a terminal changes the sidelink relay within the same base station, when the terminal changes from a connection through the sidelink relay to a direct connection with a base station within the same base station, when the terminal changes from a direct connection with a base station to a connection through the sidelink relay within the same base station, when the terminal changes the sidelink relay between different base stations, when the terminal changes from a direct connection with a base station to a connection through a sidelink relay of another base station, when the terminal changes from a connection through a sidelink relay of a base station to a direct connection with another base station, or when the terminal changes from a direct connection with a base station to a direct connection with another base station.

The technical problems to be solved in the disclosure are not limited to the above-mentioned technical problems, and those of ordinary skill in the art to which the disclosure pertains will clearly understand, from the following description, other technical problems not mentioned herein.

Technical Solution

According to an embodiment of the disclosure, a method performed by a terminal in a wireless communication system may include receiving, from a base station, measurement configuration information including at least one of frequency information of at least one neighboring cell to be measured or resource information of at least one candidate sidelink relay terminal to be measured, in order to change a path; performing measurement on the at least one neighbor cell or the at least one candidate sidelink relay terminal based on the measurement configuration information; and transmitting a result of the measurement to the base station.

In addition, the resource information of the at least one candidate sidelink relay terminal may include a physical cell identifier (PCI) of a serving cell of the at least one candidate sidelink relay terminal.

In addition, in case that the measurement result includes a measurement result for the at least one candidate sidelink relay terminal, the measurement result may include at least one of identification information of the at least one candidate sidelink relay terminal, identification information of a serving cell of the at least one candidate sidelink relay terminal, or a measurement result value for the at least one candidate sidelink relay terminal.

In addition, the method may further include receiving a message indicating a handover or a change of sidelink relay terminal from the base station; releasing a PC5 radio resource control (RRC) connection with the serving sidelink relay terminal in case that the terminal is connected to the serving sidelink relay terminal; and establishing a PC5 RRC connection with a target sidelink relay terminal in case that the terminal is connected to the serving base station.

In addition, according to an embodiment of the disclosure, a method performed by a base station in a wireless communication system may include transmitting, to a terminal, measurement configuration information including at least one of frequency information of at least one neighboring cell to be measured or resource information of at least one candidate sidelink relay terminal to be measured, in order to change a path; receiving, from the terminal, a result of measurement on the at least one neighbor cell or the at least one candidate sidelink relay terminal based on the measurement configuration information; and determining to handover the terminal or connect the terminal with a target sidelink relay terminal based on the measurement result.

In addition, the method may further include, upon determining to connect the terminal to the target sidelink relay terminal based on the received measurement result, transmitting, to the target sidelink relay terminal, a message including configuration information for a sidelink relay including at least one of identification information of the terminal, sidelink relay Uu configuration information, or sidelink relay radio link control (RLC) configuration information.

In addition, according to an embodiment of the disclosure, a terminal in a wireless communication system may comprise a transceiver; and a controller coupled with the transceiver and configured to receive, from a base station, measurement configuration information including at least one of frequency information of at least one neighboring cell to be measured or resource information of at least one candidate sidelink relay terminal to be measured, in order to change a path, to perform measurement on the at least one neighbor cell or the at least one candidate sidelink relay terminal based on the measurement configuration information, and to transmit a result of the measurement to the base station.

In addition, according to an embodiment of the disclosure, a base station in a wireless communication system may comprise a transceiver; and a controller coupled with the transceiver and configured to transmit, to a terminal, measurement configuration information including at least one of frequency information of at least one neighboring cell to be measured or resource information of at least one candidate sidelink relay terminal to be measured, in order to change a path, to receive, from the terminal, a result of measurement on the at least one neighbor cell or the at least one candidate sidelink relay terminal based on the measurement configuration information, and to determine to handover the terminal or connect the terminal with a target sidelink relay terminal based on the measurement result.

Advantageous Effects

According to an embodiment of the disclosure, it is possible to provide a device and method capable of effectively providing services and expanding service coverage in a wireless communication system.

The effects obtainable in the disclosure are not limited to the above effects, and other effects not mentioned are clearly understood from the description below by those skilled in the art.

5

Figure 6:
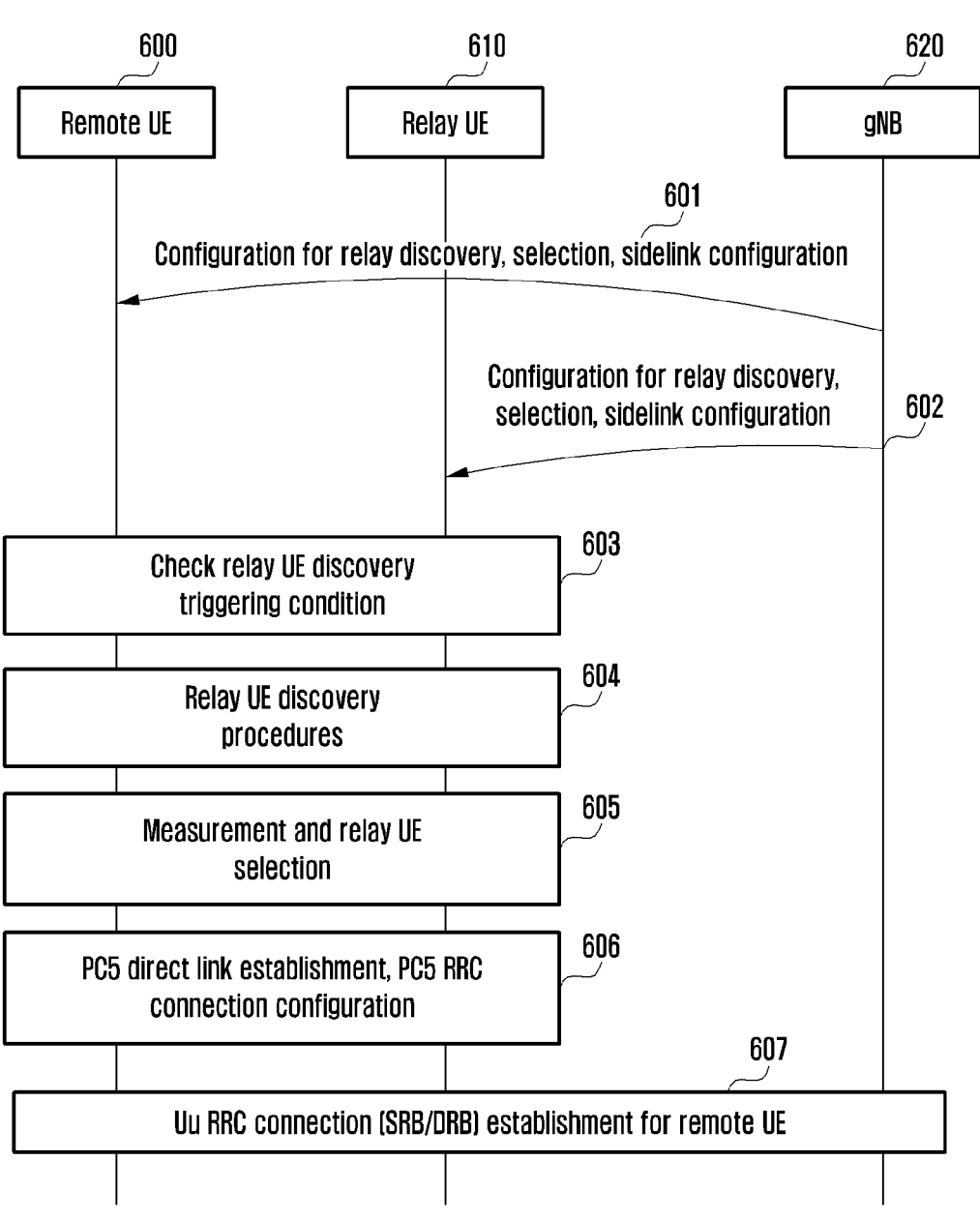

FIG. 6 is a diagram illustrating an operation sequence of a UE, a sidelink relay terminal, and a base station that process RRC connection establishment between a UE and a base station according to an embodiment of the disclosure.

Figure 7:
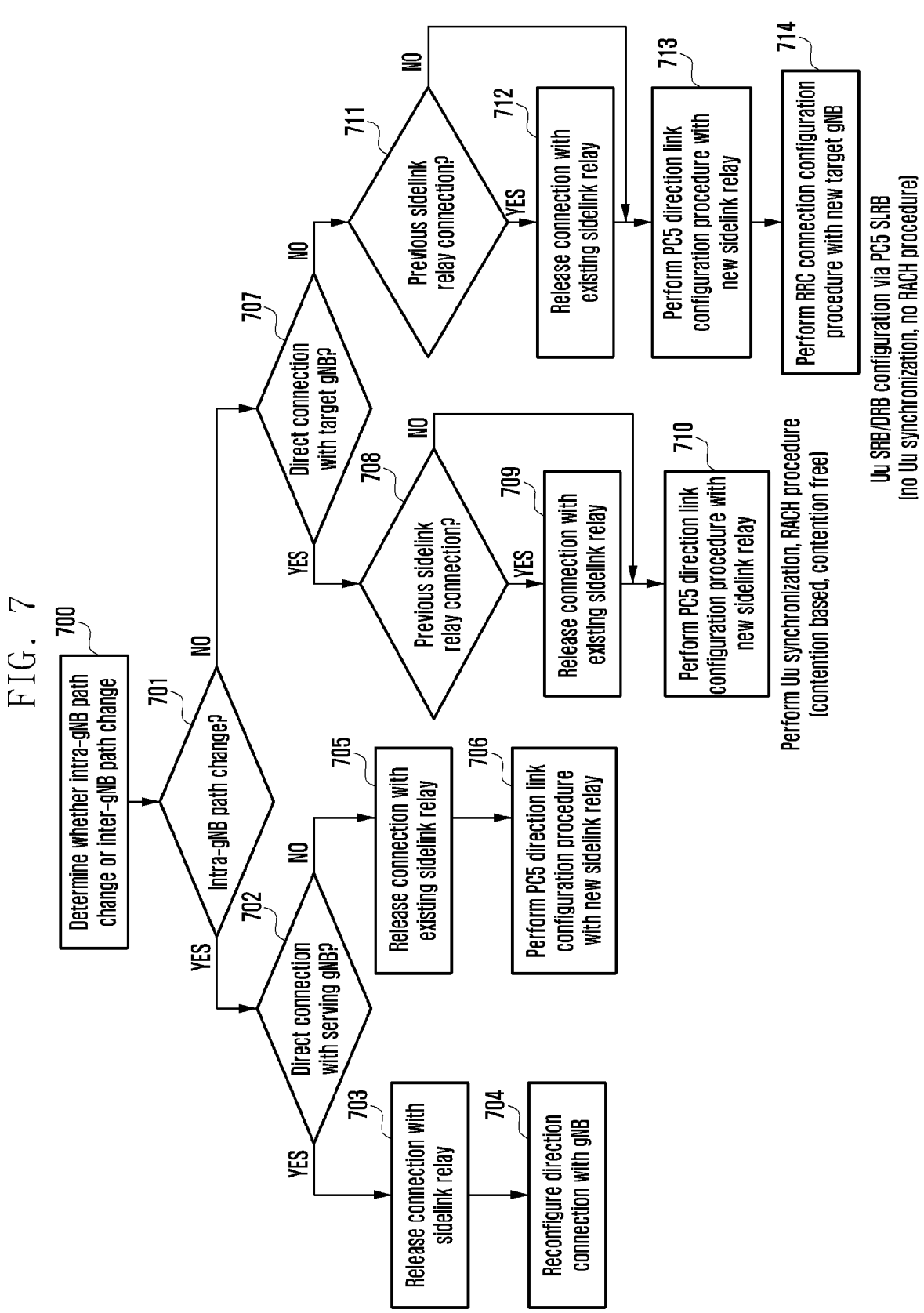

FIG. 7 is a diagram illustrating an operation sequence of a UE that processes connected mode mobility of a UE according to an embodiment of the disclosure.

Figure 8:
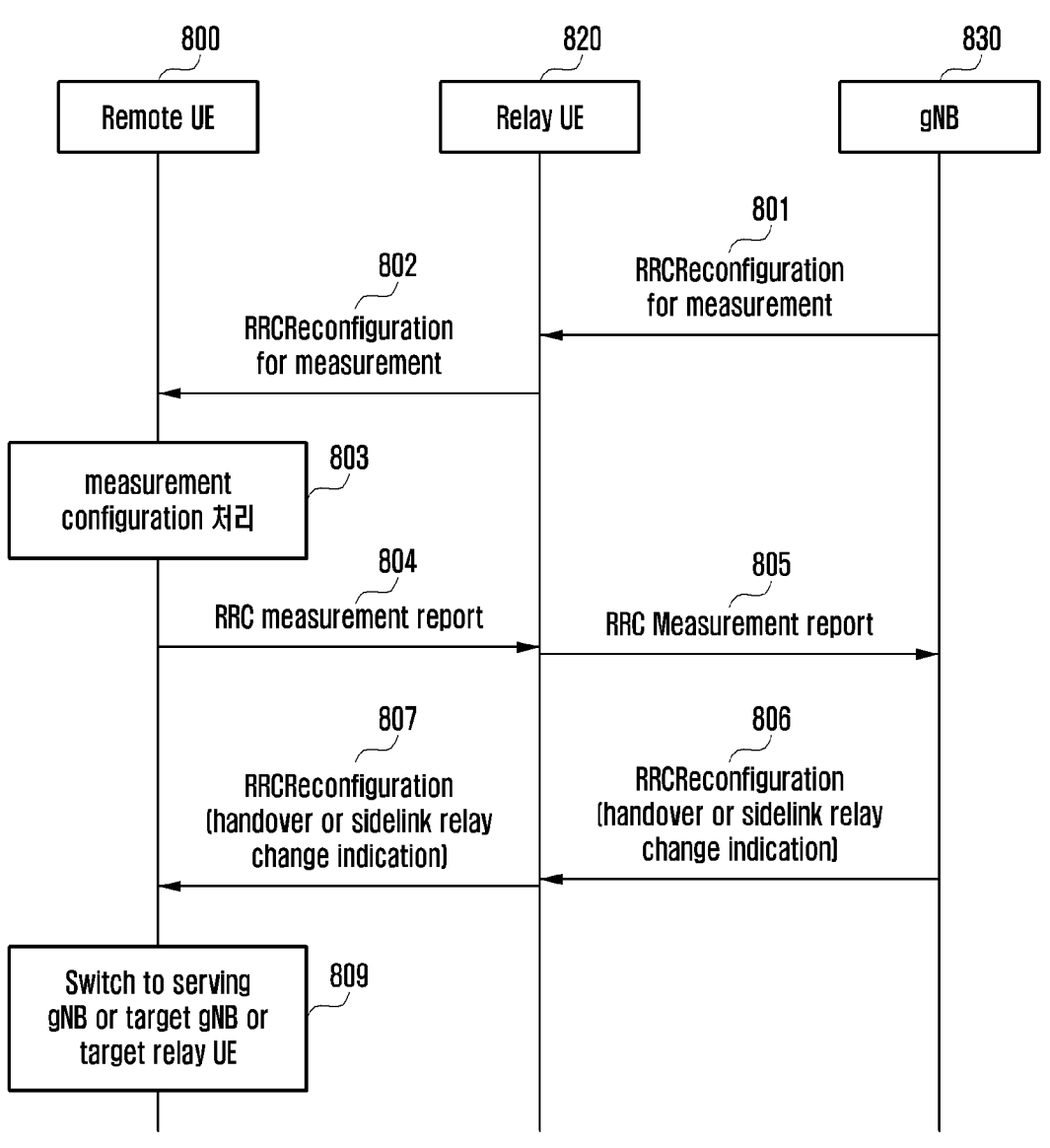

FIG. 8 is a diagram illustrating an operation sequence of a UE, a serving sidelink relay terminal, and a base station that process connected mode mobility of a UE according to an embodiment of the disclosure.

Figure 9:
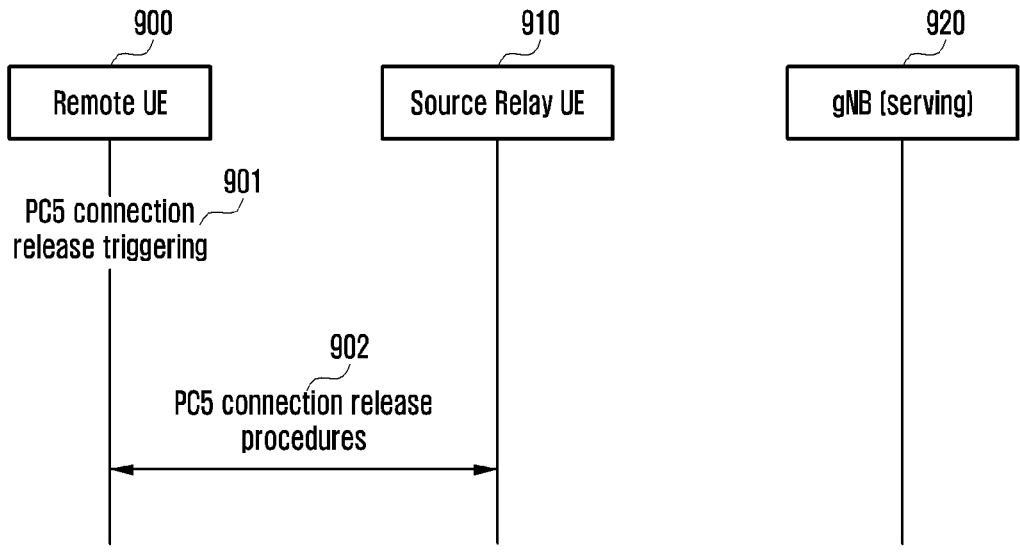

FIG. 9 is a diagram illustrating an operation sequence of a UE, a serving sidelink relay terminal, and a base station that process connected mode mobility of a UE according to an embodiment of the disclosure.

Figure 10:
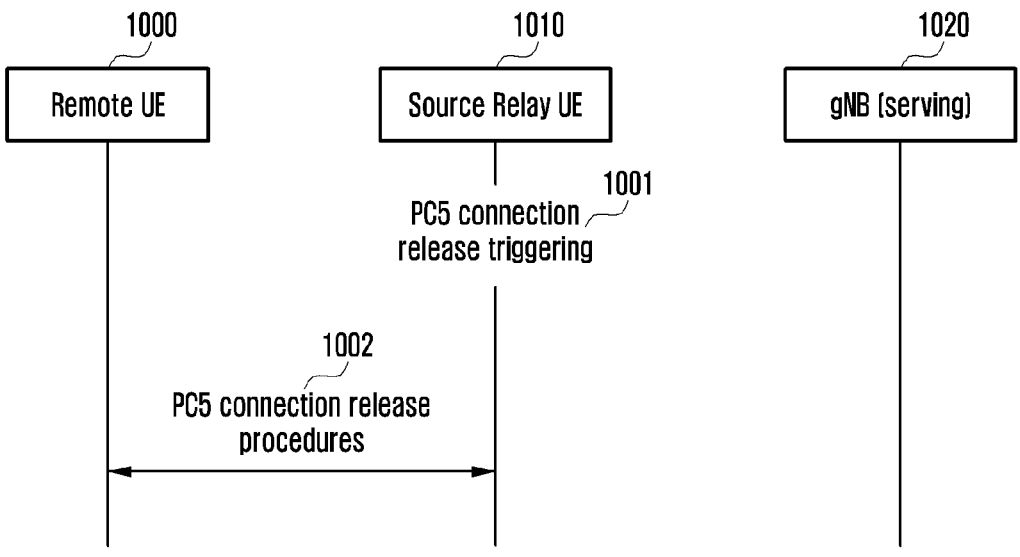

FIG. 10 is a diagram illustrating an operation sequence of a UE, a serving sidelink relay terminal, and a base station that process connected mode mobility of a UE according to another embodiment of the disclosure.

Figure 11A:
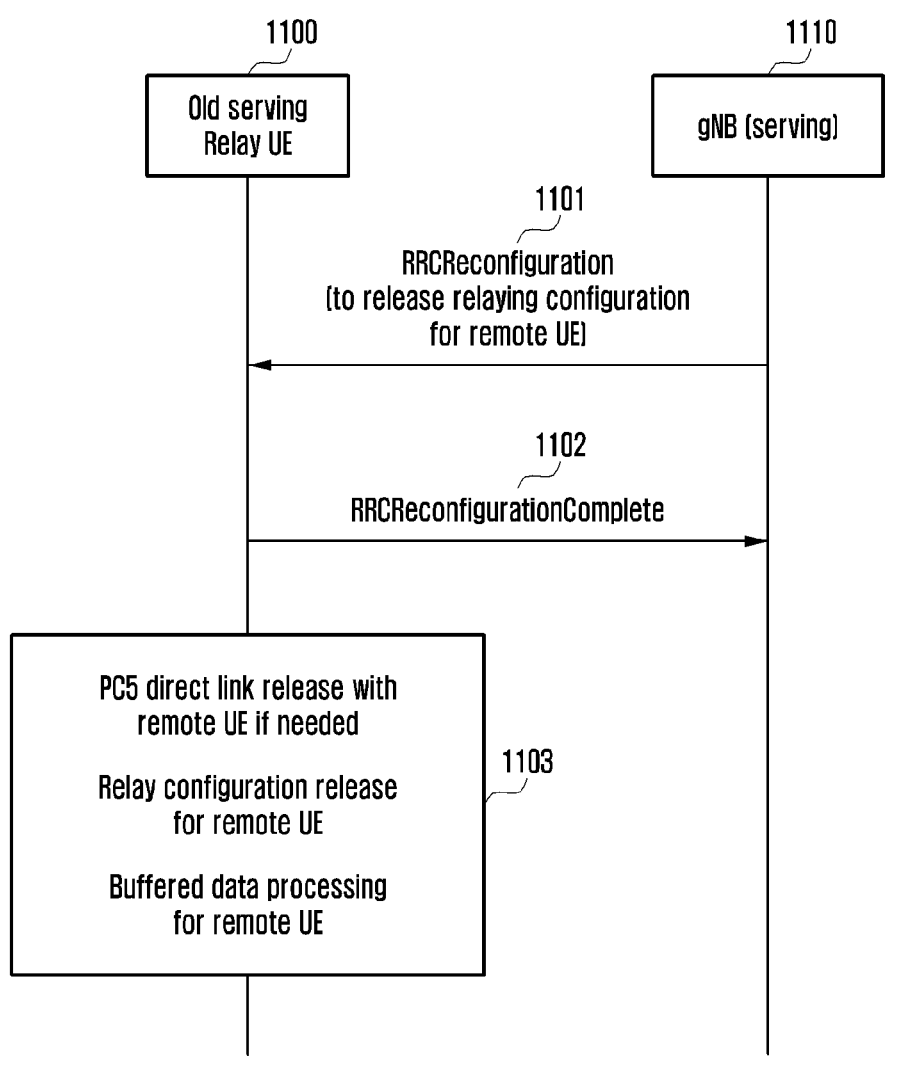

FIG. 11A is a diagram illustrating an operation sequence of a serving sidelink relay terminal and a base station that process connected mode mobility of a UE according to an embodiment of the disclosure.

Figure 11B:
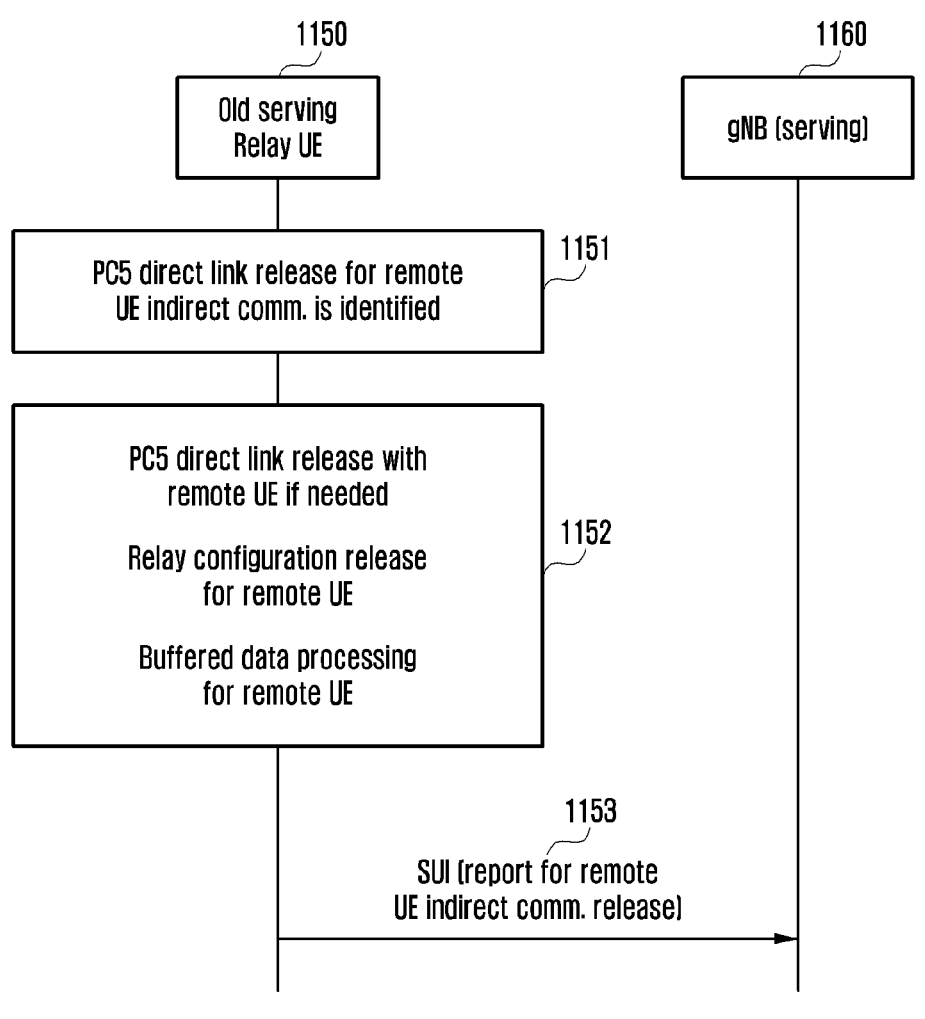

FIG. 11B is a diagram illustrating an operation sequence of a serving sidelink relay terminal and a base station that process connected mode mobility of a UE according to another embodiment of the disclosure.

Figure 12A:
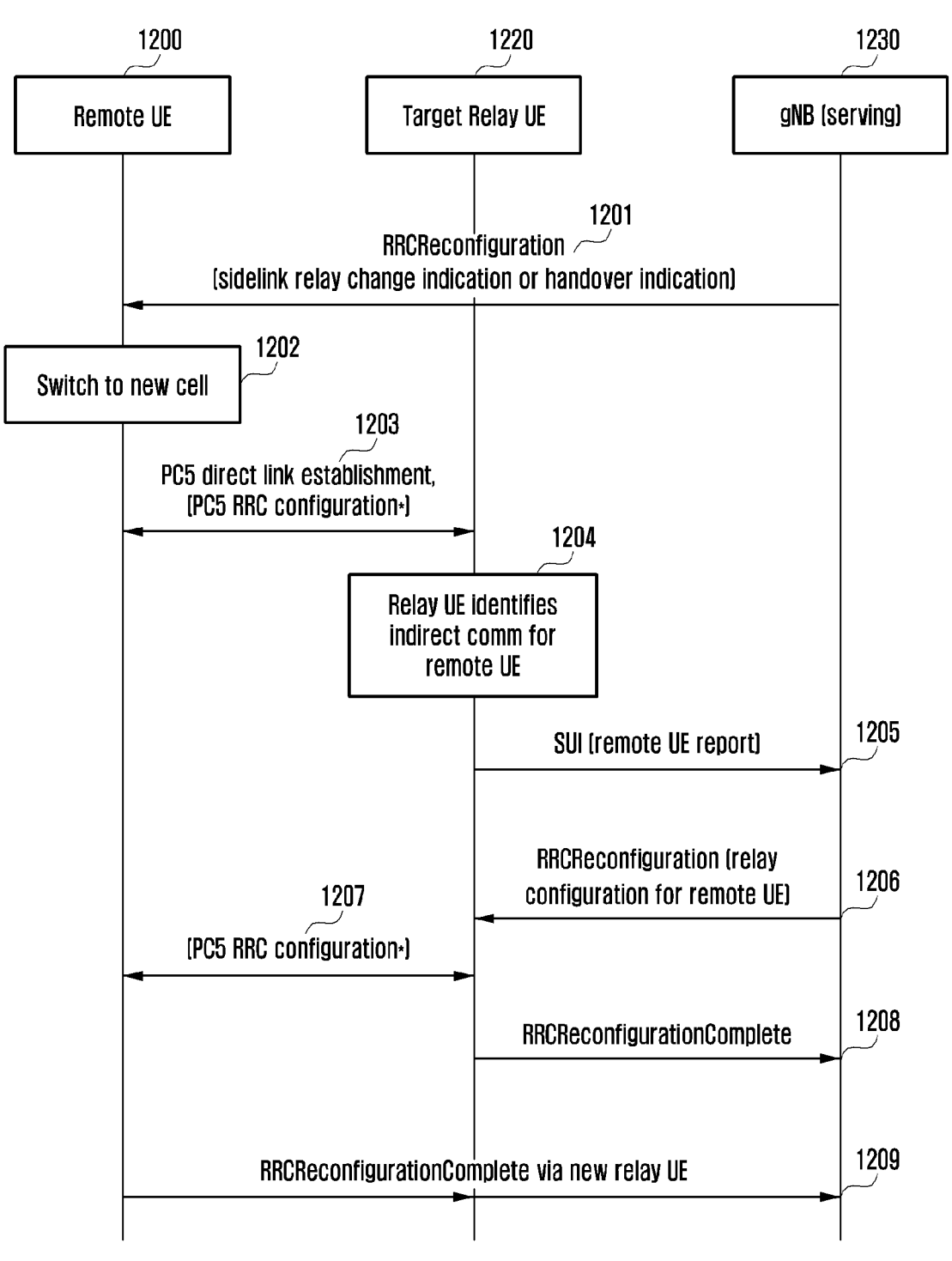

FIG. 12A is a diagram illustrating an operation sequence of a UE, a target sidelink relay terminal, and a base station that process connected mode mobility of a UE according to an embodiment of the disclosure.

Figure 12B:
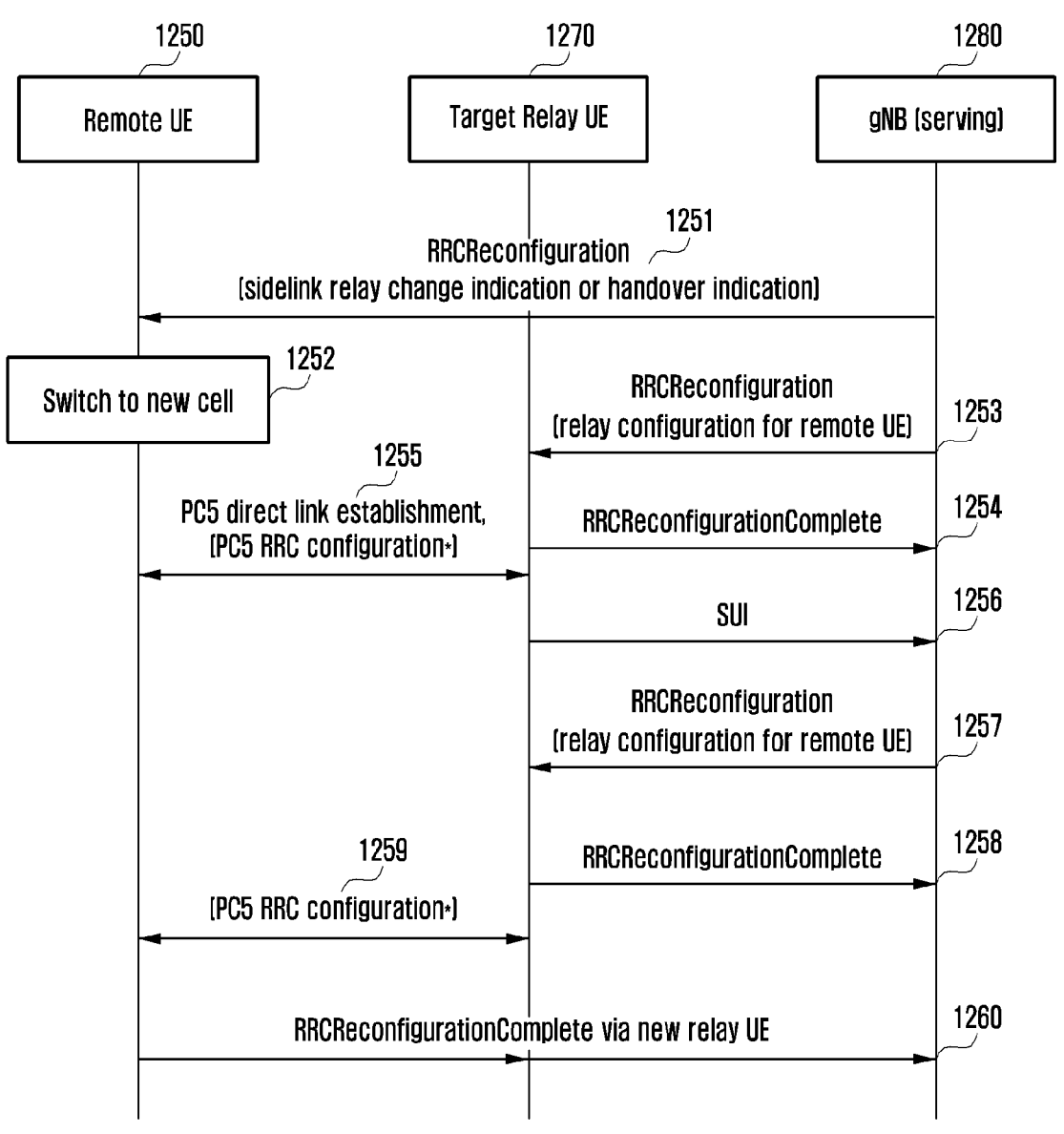

FIG. 12B is a diagram illustrating an operation sequence of a UE, a target sidelink relay terminal, and a base station that process connected mode mobility of a UE according to another embodiment of the disclosure.

Figure 13:
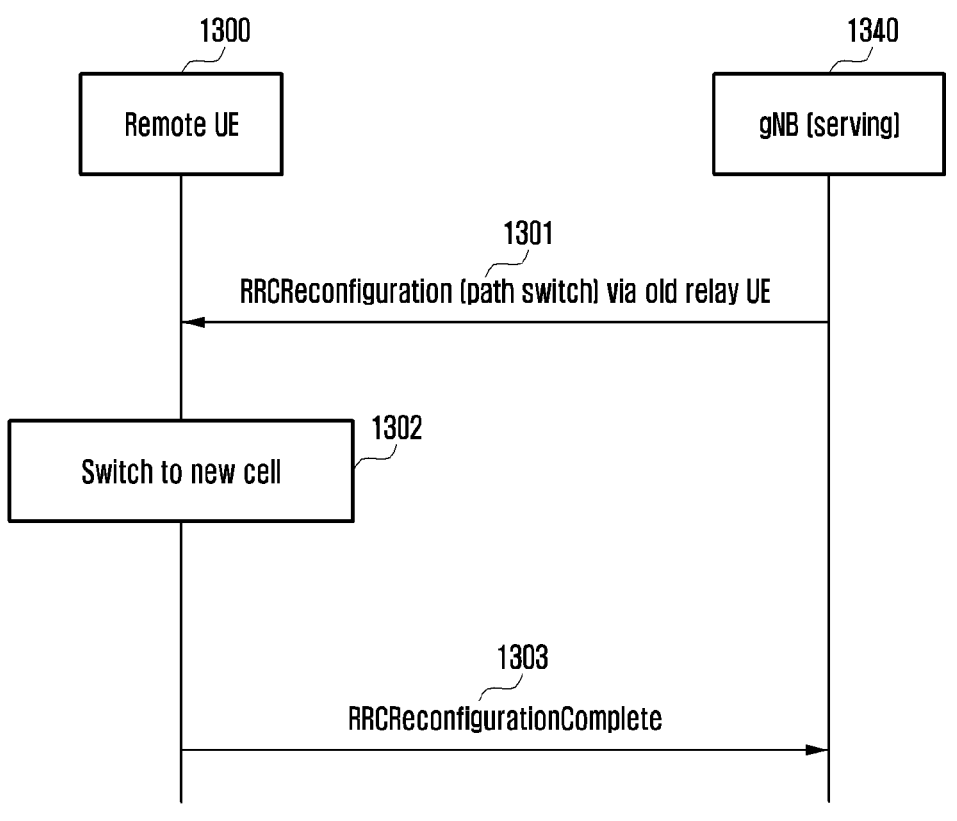

FIG. 13 is a diagram illustrating an operation sequence of a UE and a base station that process connected mode mobility of a UE according to an embodiment of the disclosure.

Figure 14:
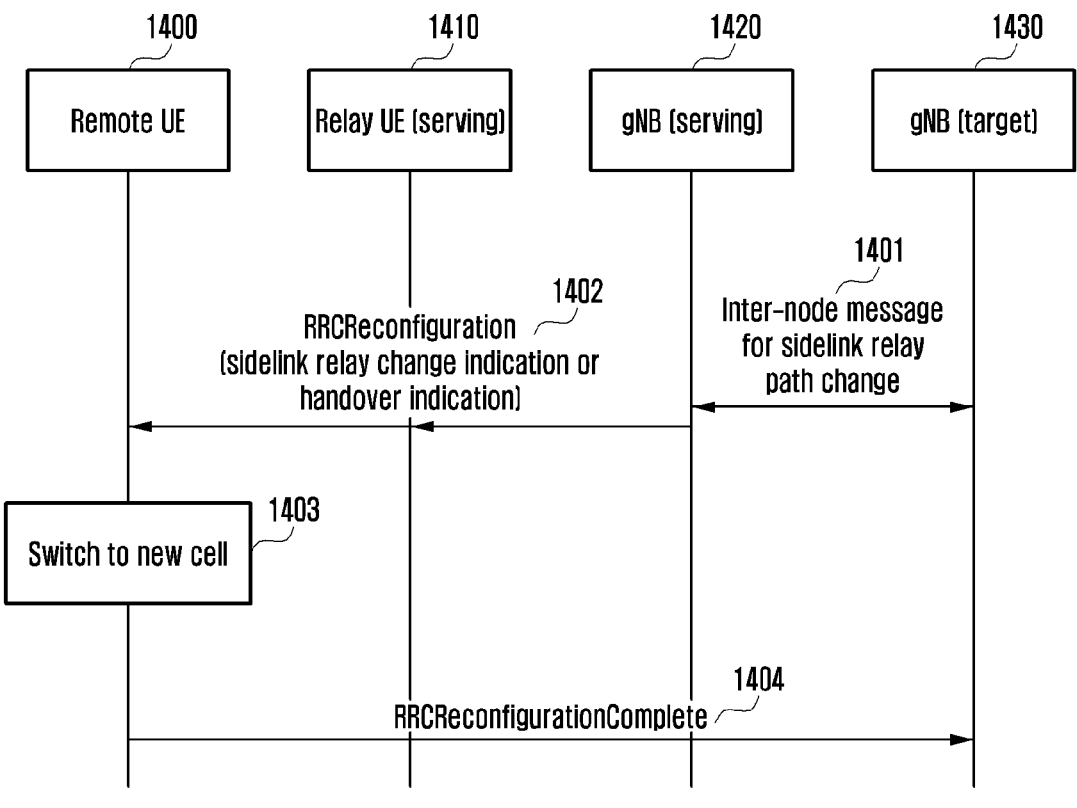

FIG. 14 is a diagram illustrating an operation sequence of a UE, a serving sidelink relay terminal, a serving base station, and a target base station that process connected mode mobility of a UE according to an embodiment of the disclosure.

FIG. 15 is a diagram illustrating an operation sequence of a UE, a serving sidelink relay terminal, a serving base station, and a target base station that process connected mode mobility of a UE according to an embodiment of the disclosure.

MODE FOR DISCLOSURE

Hereinafter, embodiments of the disclosure will be described in detail with reference to the accompanying drawings. It should be noted that in the accompanying drawings, the same element is indicated by the same reference numeral as much as possible. In addition, detailed descriptions of well-known functions and elements that may obscure the subject matter of the disclosure will be omitted.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card.

Embodiments of the disclosure will be described herein focusing a wireless access network, i.e., new radio (NR), and a packet core, i.e., a 5G system, a 5G core network, or a next generation (NG) core, according to the 5G mobile communication standard specified by the 3rd generation partnership project (3GPP) which is a mobile communication standardization organization. However, the subject matter of the disclosure can be also applied to other communication systems having similar technical backgrounds through slight modification without departing from the scope of the disclosure as will be apparent to those skilled in the art.

In the 5G system, a network data collection and analysis function (NWDAF), which is a network function of collecting, analyzing, and providing data in the 5G network, may be defined so as to support network automation. The NWDAF may collect information from the 5G network, store and analyze the collected information, and provide a result of analysis to an unspecified network function (NF). The result of analysis may be used independently in each NF.

For convenience of description below, some terms and names defined in the 3GPP standards (e.g., 5G, NR, LTE, or similar system standards) will be used. However, the disclosure is not limited by such terms and names, and may be also applied to any other system that complies with any other standard.

Hereinafter, the disclosure relates to a method and device for processing the mobility of a connected mode of a terminal when the terminal is connected to a base station directly or through a sidelink relay in a wireless communication system. Specifically, the disclosure provides, when the terminal is connected to the base station through the sidelink relay or directly, schemes of determining whether to monitor and measure a sidelink, determining whether to monitor and measure a Uu link, determining whether to report a sidelink measurement result to the base station, determining whether to report a Uu link measurement result to the base station, reporting the sidelink measurement result to the base station, reporting the Uu link measurement result to the base station, performing a handover procedure to a target base station by determining whether a handover indication to the target base station is received from the base station, performing a sidelink relay change procedure by determining whether a sidelink relay change indication within a serving base station is received from the base station, performing a direct connection procedure to the serving base station by determining whether the direct connection to the serving base station from the sidelink relay is indicated by the base station, performing a procedure for changing the target base station and the sidelink relay by determining whether a change to the sidelink relay of the target base station is indicated by the base station, and performing a procedure for changing the target base station and the sidelink relay by determining whether a change from the sidelink relay of the serving base station to the sidelink relay of the target base station is indicated by the base station. The disclosure provides, if it is determined that the terminal needs to perform a path change procedure in the serving base station or a handover and path change procedure to the target base station, procedures of releasing a sidelink connection with the serving sidelink relay, establishing a sidelink connection with the target sidelink relay, changing direct connection establishment with the serving base station, releasing a direct connection with the serving base station, establishing a direct connection with the target base station through a sidelink connection with the target sidelink relay, or establishing a direct connection with the target base station.

Therefore, according to an embodiment of the disclosure, a method for processing the mobility of a connected mode of a terminal capable of data/signaling transmission and reception with a base station through a sidelink relay in a wireless communication system includes, when the terminal is connected to a serving base station directly or through a sidelink relay, determining whether to need to perform sidelink monitoring and channel measurement; performing the sidelink monitoring and channel measurement; determining whether to need to report sidelink monitoring and channel measurement results; reporting the sidelink monitoring and channel measurement results to the serving base station; determining whether to need to perform Uu link monitoring and channel measurement; performing the Uu link monitoring and channel measurement; determining whether to need to report Uu link monitoring and channel measurement results; reporting the Uu link monitoring and channel measurement results to the serving base station; acquiring, from the serving base station, at least one of a handover indication to a Uu cell of the same base station, a path change indication to a Uu cell of the serving base station, a path change indication to a new sidelink relay of the serving base station, a handover indication to a Uu cell of a target base station, or a path change indication to a sidelink relay of the target base station; performing a handover or a path change according to the handover indication or the path change indication acquired from the serving base station; determining whether to need to maintain or release a sidelink connection with the serving sidelink relay and performing a related procedure according to the determination result; determining whether to need to maintain or release an RRC connection with the serving base station and performing a related procedure according to the determination result; determining whether to need to establish a sidelink connection with the target sidelink relay and performing a related procedure according to the determination result; determining whether to need to establish an RRC connection with the target base station and performing a related procedure according to the determination result; when establishing the RRC connection with the target base station, determining whether to need to perform an RRC connection procedure for a direct connection or an RRC connection procedure through a sidelink relay and performing a related procedure according to the determination result.

According to embodiments of the disclosure, by enabling a terminal to transmit and receive data/signaling with a base station through a sidelink relay, it is possible to expand the service coverage, increase the reliability of data transmission and reception, and minimize the battery consumption of the terminal.

In the following description, terms referring to signals, terms referring to channels, terms referring to control information, terms referring to network entities, terms referring to components of devices, and the like are illustratively used for the sake of convenience. Therefore, the disclosure is not limited by the terms as used below, and other terms referring to subjects having equivalent technical meanings may be used.

Hereinafter, a base station is a subject that performs resource allocation of a terminal, and may be at least one of a gNode B (gNB), an eNode B (eNB), a Node B, a base station (BS), a radio access unit, a base station controller, or a node on a network. A terminal may include a user equipment (UE), a mobile station (MS), a mobile phone, a smart phone, a computer, or a multimedia system capable of performing a communication function. However, this is only exemplary, and the base station and the terminal are not limited to this example. In the disclosure, an eNB may be used interchangeably with a gNB for convenience of description. That is, a base station described as an eNB may indicate a gNB. In the disclosure, the term terminal may indicate various wireless communication devices as well as a mobile phone, NB-IOT devices, and sensors.

In the following description, a physical channel and a signal may be used interchangeably with data or a control signal. For example, although a physical downlink shared channel (PDSCH) is a term referring to a physical channel through which data is transmitted, the PDSCH may also be used for referring to data. That is, in the disclosure, the expression 'transmitting a physical channel' may be interpreted as equivalent to the expression 'transmitting data or signals through a physical channel'.

Hereinafter, in the disclosure, higher signaling refers to a method of transmitting a signal from a base station to a UE using a downlink data channel of a physical layer or from a UE to a base station using an uplink data channel of a physical layer. The higher signaling may be understood as radio resource control (RRC) signaling or a media access control (MAC) control element (CE).

Further, in the disclosure, in order to determine whether a specific condition is satisfied or fulfilled, an expression of more than or less than is used, but this is only a description for expressing an example and does not exclude a description of a specific number or more or a specific number or lower. A condition described as a 'specific number or more' may be replaced with 'more than a specific number', a condition described as a 'specific number or lower' may be replaced with 'less than a specific number', and a condition described as a 'specific number or more and less than a specific number' may be replaced with 'more than a specific number and a specific number or lower'.

Further, although the disclosure describes various embodiments using terms used in some communication standards (e.g., 3rd generation partnership project (3GPP)), this is only an example for description. Various embodiments of the disclosure may be easily modified and applied in other communication systems.

Figure 1A:
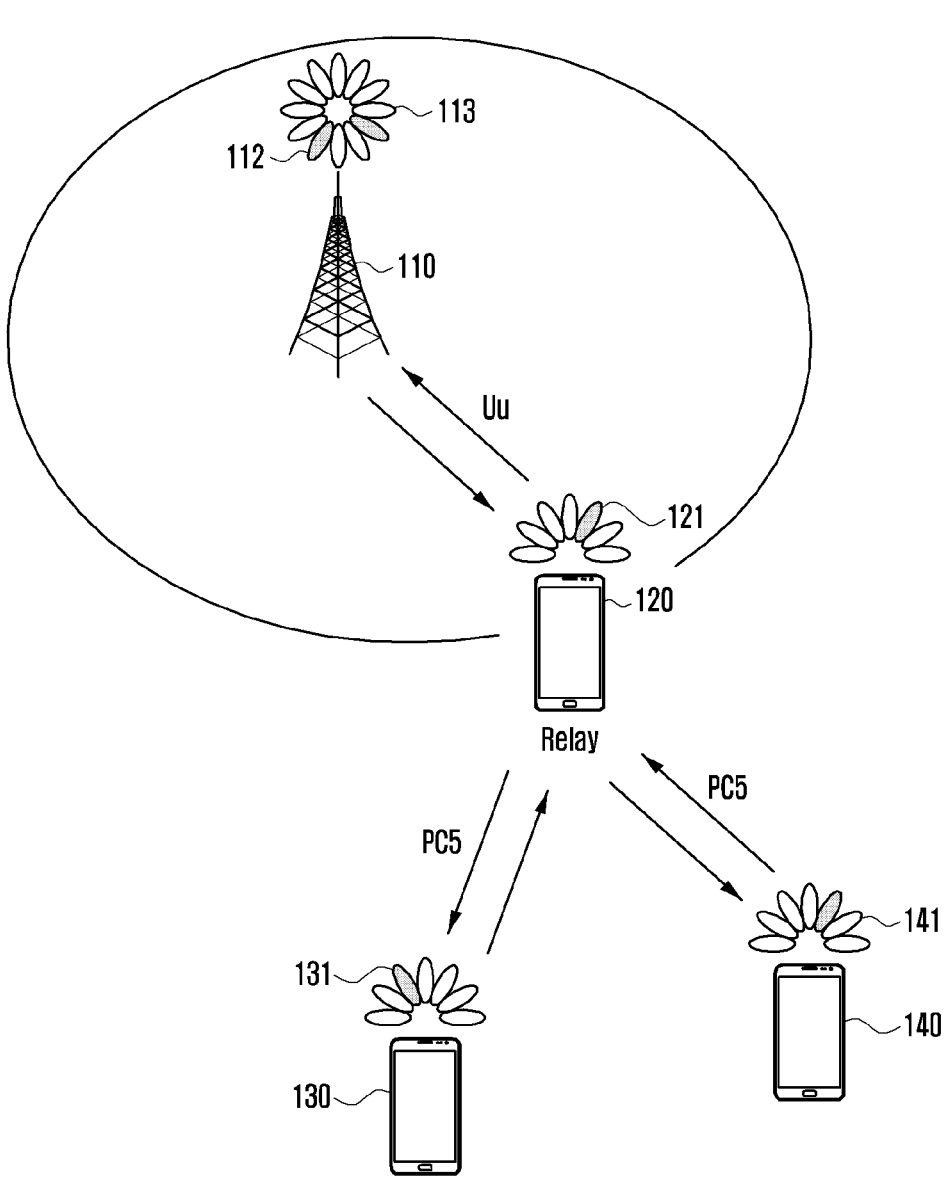
FIG. 1A is a diagram illustrating a wireless communication system according to an embodiment of the disclosure.

FIG. 1A is a diagram illustrating a wireless communication system according to an embodiment of the disclosure.

FIG. 1A illustrates, as some nodes using a radio channel in the wireless communication system, a base station 110, UEs 130 and 140, and a sidelink relay 120 capable of relaying data transmission and reception between the base station and the UEs. Here, the sidelink relay corresponds to a UE to network (U2N) relay. Although FIG. 1A shows only one base station, other base stations identical or similar to the base station 110 may be further included.

The base station 110 is a network infrastructure that provides radio access to the UEs 130 and 140 and the relay 120. The base station 110 has coverage defined as a certain geographic area based on a distance capable of transmitting a signal. In addition to the base station, the base station 110 may be referred to as an 'access point (AP)', 'eNodeB (eNB)', '5th generation node (5G node)', 'next generation nodeB (gNB)', 'wireless point', 'transmission/reception point (TRP)', or any other term having an equivalent technical meaning.

The relay 120 is a device used by a user or a network infrastructure and can communicate with the base station 110 through a radio channel. A link from the base station 110 to the relay 120 may be referred to as downlink (DL), and a link from the relay 120 to the base station 110 may be referred to as uplink (UL). The base station 110 and the relay 120 may be connected through a Uu interface. The uplink (UL) refers to a radio link in which the relay 120 transmits data or a control signal to the base station 110, and the downlink (DL) refers to a radio link in which the base station 110 transmits data or a control signal to the relay 120.

The relay 120 may communicate with the UEs 130 and 140 through a wireless channel. A link between the relay 120 and the UE 130 or 140 is referred to as sidelink, which may be referred to as a PC5 interface.

Each of the UEs 130 and 140 is a device used by a user and can perform communication with the base station 110 through a radio channel or perform communication with the relay 120 through a radio channel. In the disclosure, only a case in which each of the UEs 130 and 140 communicates with the relay 120 through a radio channel is illustrated. At least one of the UEs 130 and 140 may be operated without the user's involvement. That is, at least one of the UEs 130 and 140 may not be carried by the user, as a device that performs machine type communication (MTC). Each of the UEs 130 and 140 may be referred to as a 'terminal', 'user equipment (UE)', 'mobile station', 'subscriber station', 'remote terminal', 'wireless terminal', 'user device', or any other term having an equivalent technical meaning.

Figure 1B:
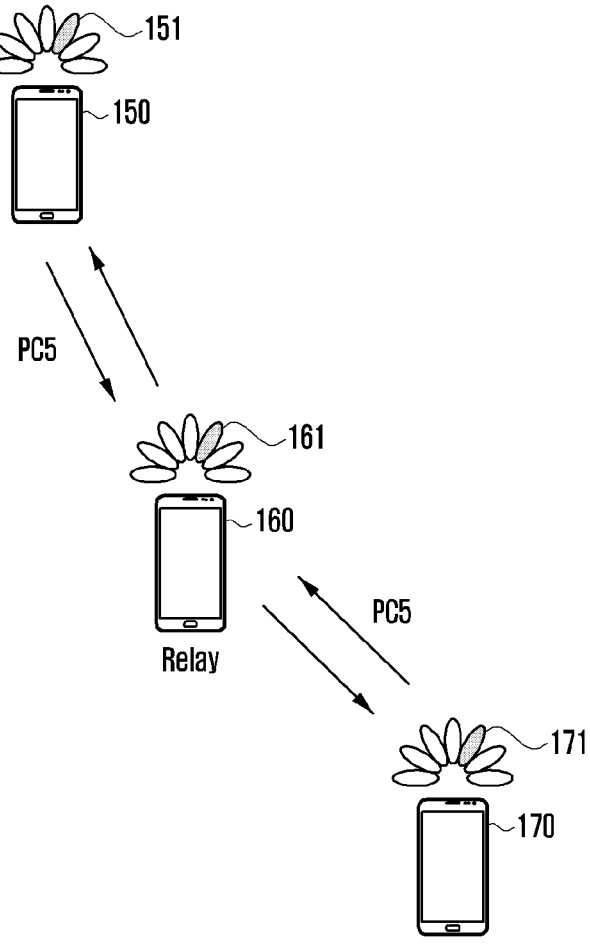
FIG. 1B is a diagram illustrating a wireless communication system according to an embodiment of the disclosure.

FIG. 1B is a diagram illustrating a wireless communication system according to an embodiment of the disclosure.

FIG. 1B illustrates, as some nodes using a radio channel in the wireless communication system, UEs 150 and 170 and a sidelink relay 160 capable of relaying data transmission and reception between the UEs. Here, the sidelink relay 160 corresponds to a UE to UE (U2U) relay.

The relay 160 may communicate with the UEs 150 and 170 through a wireless channel. A link between the relay 160 and the UE 150 or 170 is referred to as sidelink, which may be referred to as a PC5 interface.

Each of the UEs 150 and 170 is a device used by a user and can perform direct communication through a radio channel or perform communication with the relay 160 through a radio channel. A link between the UEs 150 and 170, a link between the UE 150 and the relay 160, and a link between the UE 170 and the relay 160 are referred to as sidelink, which may also be referred to as a PC5 interface.

At least one of the UEs 150 and 170 may be operated without the user's involvement. That is, at least one of the UEs 150 and 170 may not be carried by the user, as a device that performs machine type communication (MTC). Each of the UEs 150 and 170 may be referred to as a 'terminal', 'user equipment (UE)', 'mobile station', 'subscriber station', 'remote terminal', 'wireless terminal', 'user device', or any other term having an equivalent technical meaning.

In the following description, uplink or downlink and Uu interface may be used interchangeably, and sidelink and PC-5 interface may be used interchangeably.

The base station 110, the relays 120 and 160, and the UEs 130, 140, 150, and 170 shown in FIGS. 1A and 1B can transmit and receive radio signals in mmWave bands (e.g., 28 GHz, 30 GHz, 38 GHz, and 60 GHz). In this case, the base station 110, the relays 120 and 160, and the UEs 130, 140, 150, and 170 may perform beamforming in order to improve a channel gain. Here, beamforming may include transmission beamforming and reception beamforming. That is, the base station 110, the relays 120 and 160, and the UEs 130, 140, 150, and 170 may impart directivity to a transmission signal or a reception signal. To this end, the base station 110, the relays 120 and 160, and the UEs 130, 140, 150, and 170 may select serving beams 112, 113, 121, 131, 141, 151, 161, and 171 through a beam search or beam management procedure. After the serving beams 112, 113, 121, 131, 141, 151, 161, and 171 are selected, subsequent communication may be performed through a resource in a quasi-co-located (QCL) relationship with a resource that has transmitted the serving beams 112, 113, 121, 131, 141, 151, 161, and 171.

If large-scale characteristics of a channel that has transmitted a symbol on a first antenna port may be inferred from a channel that has transmitted a symbol on a second antenna port, the first antenna port and the second antenna port may be evaluated to be in a QCL relationship. For example, the large-scale characteristics may include at least one of delay spread, Doppler spread, Doppler shift, average gain, average delay, or spatial receiver parameter.

The UEs 130, 140, 150 and 170 shown in FIGS. 1A and 1B can support vehicle communication. In the case of vehicle communication, standardization for vehicle to everything (V2X) technology was completed in 3GPP Release 14 and Release 15 based on the device-to-device (D2D) communication structure in the LTE system, and standardization for V2X technology based on 5G NR was completed in 3GPP Release 16. The NR V2X can support unicast communication, groupcast (or multicast) communication, and broadcast communication between UEs. In addition, unlike the LTE V2X that aims to transmit and receive basic safety information required for road driving of a vehicle, the NR V2X aims to provide more advanced services such as platooning, advanced driving, extended sensors, and remote driving. V2X services may be divided into basic safety services and advanced services. The basic safety services may include a vehicle notification (cooperative awareness messages (CAM) or basic safety message (BSM)) service and detailed services such as a left turn notification service, a front collision warning service, an emergency vehicle approach notification service, a forward obstacle warning service, and an intersection signal information service, and V2X information may be transmitted/received using a broadcast, unicast, or groupcast transmission scheme. The advanced services not only have stronger quality of service (QOS) requirements than the basic safety services, but also require a scheme of transmitting/receiving V2X information by using unicast and groupcast transmission schemes in addition to broadcast such that V2X information can be transmitted/received within a specific vehicle group or between two vehicles. The advanced services may include detailed services such as a platooning service, an autonomous driving service, a remote driving service, and an extended sensor-based V2X service. In addition, NR V2X can provide public safety services by supporting a direct communication service between UEs in an area without network infrastructure.

Hereinafter, the sidelink (SL) refers to a transmission/reception path for a signal between the UEs or a transmission/reception path for a signal between the UE and the relay, and it may be used interchangeably with a PC5 interface. Hereinafter, the base station, as a subject that performs resource allocation of the UE, may be a base station supporting both V2X communication and general cellular communication, or a base station supporting only V2X communication. That is, the base station may refer to an NR base station (e.g., gNB), an LTE base station (e.g., eNB), or a road site unit (RSU). Generally including a user equipment (UE) or a mobile station, the terminal may include a vehicle that supports vehicle-to-vehicle (V2V)

communication, a vehicle or a pedestrian's handset (e.g., a smartphone) that supports vehicle-to-pedestrian (V2P) communication, a vehicle that supports vehicle-to-network (V2N) communication, a vehicle that supports vehicle-to-infrastructure (V2I) communication, an RSU having a UE function, an RSU having a base station function, or an RSU having a part of the base station function and a part of the UE function.

Meanwhile, in the disclosure, the UE may refer to a vehicle that supports vehicle-to-vehicle (V2V) communication, a vehicle or a pedestrian's handset (e.g., a smartphone) that supports vehicle-to-pedestrian (V2P) communication, a vehicle that supports vehicle-to-network (V2N) communication, or a vehicle that supports vehicle-to-infrastructure (V2I) communication. The UE may refer to a user device that supports communication between devices of a public safety network.

Also, in the disclosure, the UE may refer to a road side unit (RSU) equipped with a UE function, an RSU equipped with a base station function, or an RSU equipped with a part of a base station function and a part of a UE function.

In the disclosure, the relay may refer to a vehicle supporting V2X communication or a user device supporting communication between devices of a public safety network. Also, in the disclosure, the relay may refer to a device equipped with a UE function, a device equipped with a base station function, or a device equipped with a part of a UE function and a part of a base station function.

Figure 2:
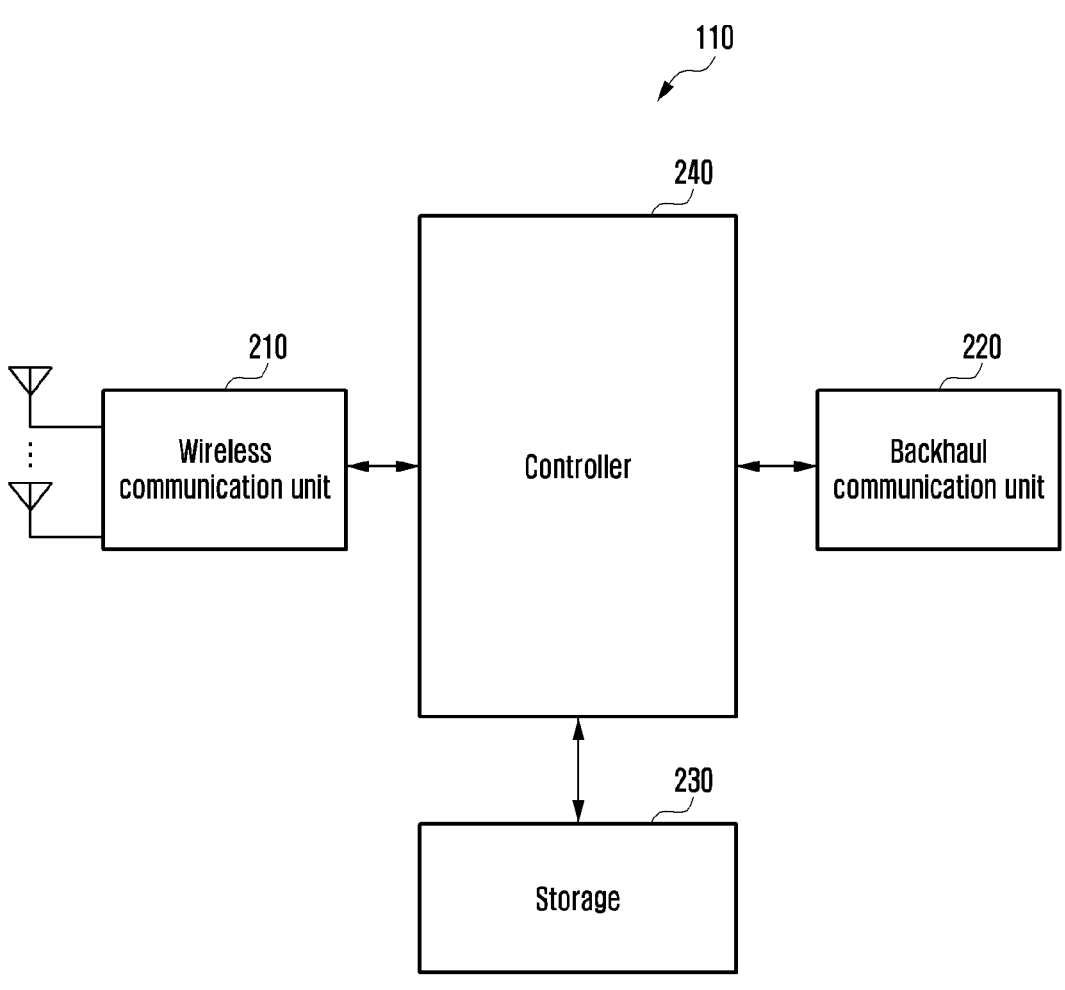
FIG. 2 is a diagram illustrating the constitution of a base station in a wireless communication system according to an embodiment of the disclosure.

FIG. 2 is a diagram illustrating the constitution of a base station in a wireless communication system according to an embodiment of the disclosure.

The constitution shown in FIG. 2 may be understood as the constitution of the base station 110. Terms such as ' . . . unit', ' . . . er', etc. used hereinafter refer to a unit that processes at least one function or operation, and this may be implemented with hardware, software, or a combination of hardware and software.

Referring to FIG. 2, the base station 110 may include a wireless communication unit 210, a backhaul communication unit 220, a storage 230, and a controller 240. However, elements of the base station 110 are not limited to the above example. For example, the base station may include more or fewer elements than those described above. In addition, the wireless communication unit 210, the backhaul communication unit 220, the storage 230, and the controller 240 may be implemented in a single chip form. Also, the controller 240 may include one or more processors.

The wireless communication unit 210 may perform functions for transmitting and receiving signals through a radio channel. For example, the wireless communication unit 210 may perform a function of conversion between a baseband signal and a bit string in accordance with a physical layer standard of a system. For example, upon transmitting data, the wireless communication unit 210 may encode and modulate a transmission bit string and thereby generate complex symbols. Also, upon receiving data, the wireless communication unit 210 may restore a reception bit string through demodulation and decoding of a baseband signal.

In addition, the wireless communication unit 210 up-converts a baseband signal into a radio frequency (RF) band signal, transmits the RF band signal through an antenna, and down-converts an RF band signal received through the antenna into a baseband signal. To this end, the wireless communication unit 210 may include a transmission filter, a reception filter, an amplifier, a mixer, an oscillator, a digital to analog converter (DAC), an analog to digital converter (ADC), and the like. Further, the wireless communication unit 210 may include a plurality of transmission and reception paths. Also, the wireless communication unit 210 may include at least one antenna array composed of a plurality of antenna elements.

In terms of hardware, the wireless communication unit 210 may be composed of a digital unit and an analog unit, and the analog unit may be composed of a plurality of sub-units according to operating power, operating frequency, and the like. The digital unit may be implemented with at least one processor (e.g., digital signal processor (DSP)).

The wireless communication unit 210 transmits and receives signals as described above. Accordingly, all or part of the wireless communication unit 210 may be referred to as a 'transmitter', 'receiver', or 'transceiver'. Further, in the following description, transmission and reception performed through a radio channel are used in the meaning including the processing being performed as described above by the wireless communication unit 210.

The backhaul communication unit 220 may provide an interface for performing communication with other nodes in the network. That is, the backhaul communication unit 220 may convert a bit string transmitted from the base station 110 to another node, for example, another access node, another base station, an upper node, the core network, and the like into a physical signal, and convert a physical signal received from any other node to a bit string.

The storage 230 may store a default program for the operation of the base station 110, an application program, and data such as configuration information. The storage 230 may be composed of a volatile memory, a non-volatile memory, or a combination thereof. Further, the storage 230 may provide the stored data in response to the request of the controller 240.

The controller 240 may control the overall operations of the base station. For example, the controller 240 may transmit and receive a signal through the wireless communication unit 210 or the backhaul communication unit 220. In addition, the controller 240 writes and reads data in the storage 230. Further, the controller 240 may perform functions of a protocol stack required in the communication standard. According to another implementation example, the protocol stack may be included in the wireless communication unit 210. To this end, the controller 240 may include at least one processor. According to various embodiments, the controller 240 may control the base station to perform operations according to various embodiments to be described later.

Figure 3:
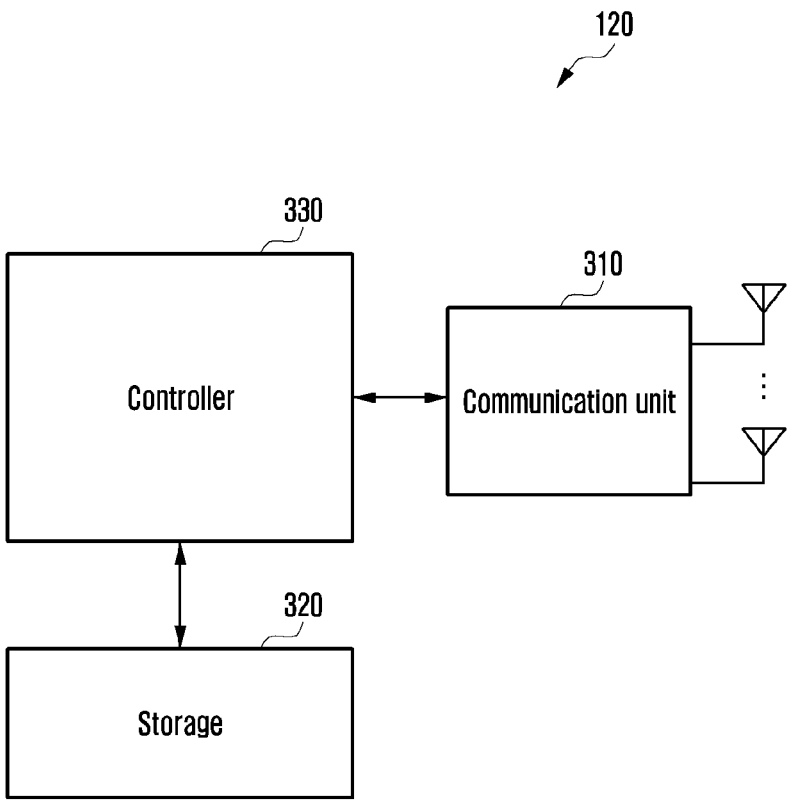
FIG. 3 is a diagram illustrating the constitution of a UE in a wireless communication system according to an embodiment of the disclosure.

FIG. 3 is a diagram illustrating the constitution of a UE in a wireless communication system according to an embodiment of the disclosure.

The constitution shown in FIG. 3 may be understood as the constitution of the UE 120. Terms such as ' . . . unit', ' . . . er', etc. used hereinafter refer to a unit that processes at least one function or operation, and this may be implemented into hardware or software, or a combination of hardware and software.

Referring to FIG. 3, the UE 120 may include a communication unit 310, a storage 320, and a controller 330. However, elements of the UE 120 are not limited to the above example. For example, the UE 120 may include more or fewer elements than those described above. In addition, the communication unit 310, the storage 320, and the controller 330 may be implemented in a single chip form. Also, the controller 330 may include one or more processors.

The communication unit 310 performs functions for transmitting and receiving signals through a radio channel. For example, the communication unit 310 may perform a function of conversion between a baseband signal and a bit string in accordance with a physical layer standard of a system. For example, when transmitting data, the communication unit 310 encodes and modulates a transmission bit string and thereby generates complex symbols. Also, when receiving data, the communication unit 310 restores a reception bit string through demodulation and decoding of a baseband signal. Further, the communication unit 310 up-converts a baseband signal into an RF band signal, transmits the RF band signal through an antenna, and down-converts an RF band signal received through the antenna into a baseband signal. For example, the communication unit 310 may include a transmission filter, a reception filter, an amplifier, a mixer, an oscillator, a DAC, an ADC, and the like.

Further, the communication unit 310 may include a plurality of transmission and reception paths. Also, the communication unit 310 may include at least one antenna array composed of a plurality of antenna elements. In terms of hardware, the communication unit 310 may be composed of a digital circuit and an analog circuit (e.g., radio frequency integrated circuit (RFIC)). Here, the digital circuit and the analog circuit may be implemented into one package. In addition, the communication unit 310 may include a plurality of RF chains. Also, the communication unit 310 may perform beamforming.

The communication unit 310 may transmit and receive signals as described above. Accordingly, all or part of the communication unit 310 may be referred to as a 'transmitter', 'receiver', or 'transceiver'. Further, in the following description, transmission and reception performed through a radio channel are used in the meaning including the processing being performed as described above by the communication unit 310.

The storage 320 may store a default program for the operation of the UE, an application program, and data such as configuration information. The storage 320 may be composed of a volatile memory, a non-volatile memory, or a combination thereof. Further, the storage 320 provides the stored data in response to the request of the controller 330.

The controller 330 controls the overall operations of the UE. For example, the controller 330 may transmit and receive a signal through the communication unit 310. In addition, the controller 330 writes and reads data in the storage 320. Further, the controller 330 may perform functions of a protocol stack required in the communication standard. To this end, the controller 330 may include at least one processor or microprocessor or may be a part of the processor. Further, a part of the communication unit 310 and the controller 330 may be referred to as a communication processor (CP). According to various embodiments, the controller 330 may control the UE 120 to perform operations according to various embodiments to be described later.

Figure 4:
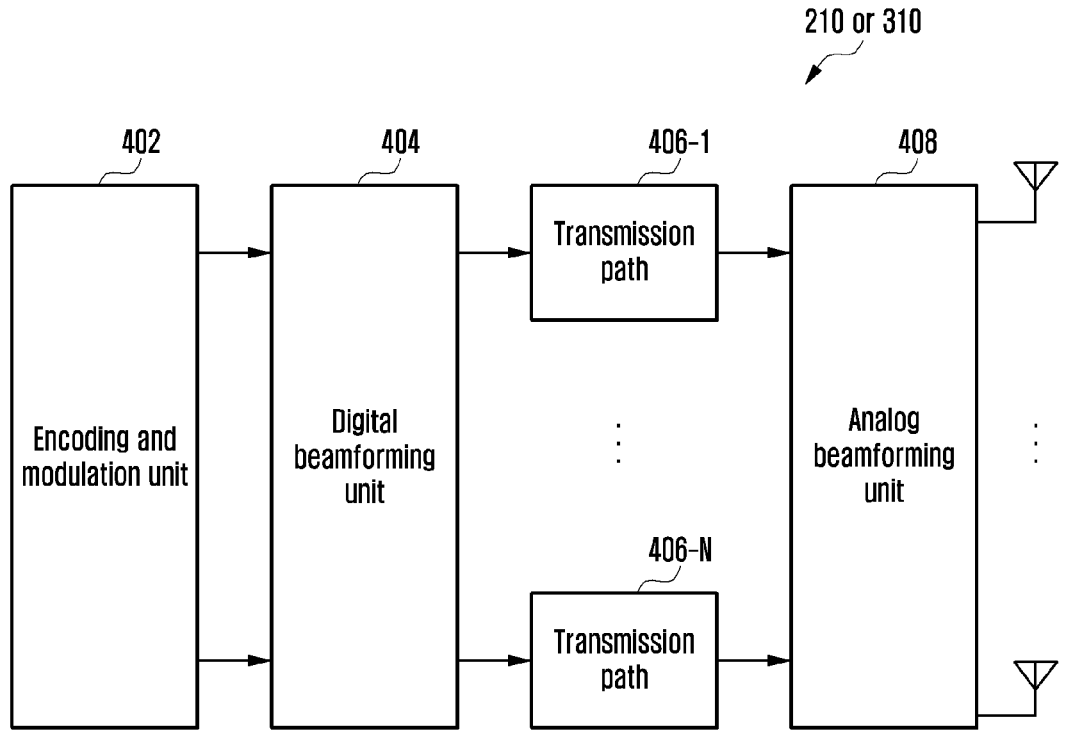
FIG. 4 is a diagram illustrating the constitution of a communication unit in a wireless communication system according to an embodiment of the disclosure.

FIG. 4 is a diagram illustrating the constitution of a communication unit in a wireless communication system according to an embodiment of the disclosure.

FIG. 4 illustrates an example of a detailed constitution of the wireless communication unit 210 of FIG. 2 or the communication unit 310 of FIG. 3. Specifically, FIG. 4 illustrates elements for performing beamforming as a part of the wireless communication unit 210 of FIG. 2 or the communication unit 310 of FIG. 3.

Referring to FIG. 4, the wireless communication unit 210 or the communication unit 310 may include an encoding and modulation unit 402, a digital beamforming unit 404, a plurality of transmission paths 406-1 to 406-N, and an analog beamforming unit 408.

The encoding and modulation unit 402 may perform channel encoding. For channel encoding, at least one of a low density parity check (LDPC) code, a convolution code, or a polar code may be used. The encoding and modulation unit 402 may perform constellation mapping and thereby generate modulation symbols.

The digital beamforming unit 404 may perform beamforming on a digital signal (e.g., modulation symbols). To this end, the digital beamforming unit 404 multiplies modulation symbols by beamforming weights. Here, the beamforming weights are used for changing the magnitude and phase of a signal, and may be referred to as a 'precoding matrix', a 'precoder', or the like. The digital beamforming unit 404 may output digital-beamformed modulation symbols to a plurality of transmission paths 406-1 to 406-N. In this case, depending on a multiple input multiple output (MIMO) transmission technique, modulation symbols may be multiplexed or the same modulation symbols may be provided to the plurality of transmission paths 406-1 to 406-N.

The plurality of transmission paths 406-1 to 406-N may convert digital-beamformed digital signals into analog signals. To this end, each of the plurality of transmission paths 406-1 to 406-N may include an inverse fast Fourier transform (IFFT) operation unit, a cyclic prefix (CP) insertion unit, a DAC, and an up-conversion unit. The CP insertion unit is for an orthogonal frequency division multiplexing (OFDM) scheme and may be excluded in the case that any other physical layer scheme (e.g., filter bank multi-carrier (FBMC)) is applied. That is, the plurality of transmission paths 406-1 to 406-N may provide independent signal processing processes for a plurality of streams generated through digital beamforming. However, depending on implementation types, some of elements of the plurality of transmission paths 406-1 to 406-N may be used in common.

The analog beamforming unit 408 may perform beamforming on an analog signal. To this end, the digital beamforming unit 404 may multiply the analog signals by beamforming weights. Here, the beamforming weights are used for changing the magnitude and phase of the signal. Specifically, the analog beamforming unit 408 may be variously configured depending on a connection structure between the plurality of transmission paths 406-1 to 406-N and antennas. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array or connected to two or more antenna arrays.

Figure 5:
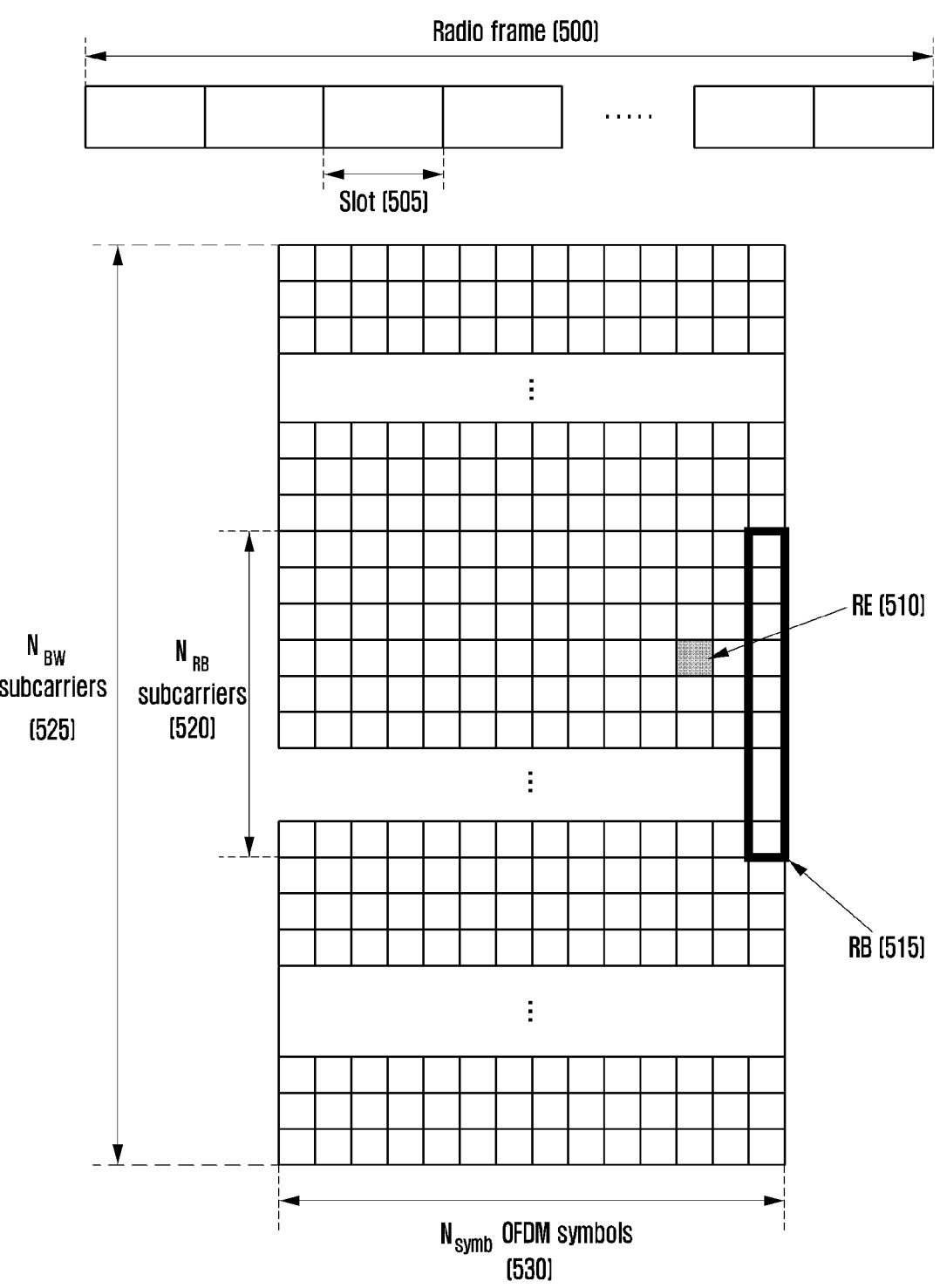
FIG. 5 is a diagram illustrating the structure of a time-frequency resource of a wireless communication system according to an embodiment of the disclosure.

FIG. 5 is a diagram illustrating the structure of a time-frequency resource of a wireless communication system according to an embodiment of the disclosure.

Referring to FIG. 5, the horizontal axis represents the time domain and the vertical axis represents the frequency domain in the radio resource domain. The minimum transmission unit in the time domain is an OFDM symbol or a DFT-S-OFDM symbol, and $N_{symb}$ OFDM symbols or DFT-S-OFDM symbols 530 may be contained in one slot 505. Unlike the slot, in the NR system, the length of a subframe may be defined as 1.0 ms, and the length of a radio frame 500 may be defined as 10 ms. The minimum transmission unit in the frequency domain is a subcarrier, and the bandwidth of the entire system transmission bandwidth may include a total of $N_{BW}$ subcarriers 525. Specific values such as $N_{symb}$ and $N_{BW}$ may be applied variably depending on the system.

A basic unit of the time-frequency resource domain is a resource element (RE) 510, which may be represented by an OFDM symbol index or a DFT-S-OFDM symbol index and a subcarrier index. A resource block (RB) 515 may be defined as $N_{RB}$ consecutive subcarriers 520 in the frequency domain. In general, the minimum transmission unit of data is an RB unit, and in the NR system, $N_{symb}$ is 14 and $N_{RB}$ is 12.

The time-frequency resource structure as shown in FIG. 5 is applied to the Uu interface. In addition, the time-frequency resource structure as shown in FIG. 5 may be similarly applied to the sidelink.

According to various embodiments of the disclosure, operation procedures of a UE, a sidelink relay, and a base station for handling mobility of a connected mode (RRC_CONNECTED state) of the UE in the case where the UE (also referred to as a remote UE) performs data transmission and reception through a direct connection with the base station and in the case where the UE performs data transmission and reception through a connection with the base station through the sidelink relay (also referred to as a relay or a relay UE) will be described. The sidelink relay may be authorized to be used in at least one or a combination of a specific service, a specific UE, a specific sidelink flow, a specific sidelink bearer, a specific unicast link, a specific source identifier, and a specific destination identifier. The sidelink relay can establish a direct connection with an authenticated UE at the time of installation. Upon receiving a relay discovery message from the authenticated UE, the sidelink relay can establish a sidelink direct connection with the UE. Upon receiving a relay discovery message as a response to a relay discovery message transmitted by the sidelink relay itself from the authenticated UE, the sidelink relay can establish a sidelink direct connection with the UE. Upon receiving a PC5 direct link establishment request from an authenticated UE, the sidelink relay can establish a sidelink direct connection with the UE. A method of the PC5 direct link establishment request used for relay connection by the sidelink relay and the UE may include at least one or a combination of a method of inserting "connection indication through relay" in a general PC5 direct link establishment request message, a method of separately defining "PC5 direct link establishment message for relay use", or a method of configuring to use a general PC5 direct link establishment request message transmitted in a sidelink radio bearer (which can be denoted as SLRB) for relay.

FIG. 6 is a diagram illustrating an operation sequence of a UE, a sidelink relay terminal, and a base station that process RRC connection establishment between a UE and a base station according to an embodiment of the disclosure.

Referring to FIG. 6, a UE 600 and a sidelink relay 610 may acquire, from a base station 620, configuration information necessary for performing sidelink relay discovery, sidelink relay selection, and transmission/reception of sidelink data/signaling (steps 601 and 602). The steps 601 and 602 may correspond to a case where the UE 600 and the sidelink relay 610 are located in the base station coverage. If it is determined that the UE 600 or the sidelink relay 610 is out-of-coverage, configuration information necessary for performing sidelink relay discovery, sidelink relay selection, and transmission/reception of sidelink data/signaling may be acquired from pre-configuration. At step 603, by referring to the configuration information of the steps 601 and 602, the UE 600 or the sidelink relay 610 may determine whether a condition for triggering a sidelink relay discovery procedure is satisfied. At step 604, by referring to the configuration information of the steps 601 and 602, the UE 600 or the sidelink relay 610 may perform a sidelink relay discovery procedure. At step 605, by referring to the configuration information of the steps 601 and 602, the UE 600 or the sidelink relay 610 may perform a measurement procedure for selecting a sidelink relay and the sidelink relay selection may be based on configuration conditions.

An embodiment of criterion for determining whether the UE establishes a direct connection with the base station is as follows. If it is determined that at least one or a combination of the case where the UE finds a connectable cell through a cell selection or cell reselection procedure or the case where there is a sidelink relay connectable to the base station but a connection establishment condition with the sidelink relay is not satisfied (e.g., a signal measurement value such as sidelink reference signal received power (SL RSRP) transmitted by the sidelink relay is lower than a threshold), the UE may determine to perform a procedure of direct connection to the base station. An embodiment of a criterion for determining whether the UE establishes a connection to the base station through a connection with the sidelink relay is as follows. If it is determined that at least one or a combination of the case where there is no connectable cell through a cell selection or cell reselection procedure or the case where the base station direct connection condition is not satisfied but the connection establishment condition with the sidelink relay is satisfied, the UE may determine to perform a procedure of connection to the base station via the sidelink relay.

At step 606, the UE 600 and the sidelink relay 610 may establish a sidelink direct connection to perform data/signaling transmission/reception with the base station 620 through the sidelink relay. The sidelink direct connection establishment procedure follows a PC5-S signaling message transmission and reception procedure of a V2X layer of the UE 600 and the sidelink relay 610. In addition, the UE 600 and the sidelink relay 610 may perform a PC5 RRC procedure. The PC5 RRC procedure may include a UE capability enquiry sidelink/UE capability information sidelink message procedure for exchanging sidelink capability information and an RRCReconfigurationSidelink/RRCReconfigurationCompleteSidelink message procedure for setting PC5 RRC configuration. The PC5 RRC configuration setting procedure may also be performed to configure a PC5 SLRB to be applied when the UE 600 and the sidelink relay 610 transmit and receive data/signaling between the UE 600 and the base station 620 through the sidelink interface. At step 607, the UE 600 may perform an RRC connection establishment procedure to the base station 620 through the sidelink relay 610. Through the procedure of step 607, the base station 620 may configure a data radio bearer (DRB)/signaling radio bearer (SRB) for data/signaling purposes of the UE 600. Through the procedure of step 607, the base station 620 may configure the PC5 SLRB mapped to the DRB/SRB of the UE 600 in the UE 600 and the sidelink relay 610. The UE 600 and the sidelink relay 610 may use the configured PC5 SLRB to transmit and receive data/signaling transmitted to the base station 620 by the UE 600 and transmit and receive data/signaling transmitted to the UE 600 by the base station 620. The sidelink relay 610 may relay data/signaling between the UE 600 and the base station 620 by performing an operation of mapping data/signaling of the UE 600 corresponding to PC5 SLRB to Uu DRB/SRB and an operation of mapping data/signaling of the UE 600 corresponding to Uu DRB/SRB to PC5 SLRB. Meanwhile, the step 607 may start when the UE 600 transmits an RRCSetupRequest message for initiating the RRC connection establishment procedure with the base station 620.

Mobility scenarios that can be considered in the connected mode of the UE are shown in [Table 1].

TABLE 1

| |
|---|
| Connection with base station through sidelink relay <–> Direct connection to base station |
| Scenario 1: Mobility between direct (Uu) path and indirect (via the relay) path (mobility in same base station) |
| Scenario 2: Mobility between direct (Uu) path and indirect (via the relay) path (mobility between base stations) |
| Connection with base station through sidelink relay A <–> Connection with base station through sidelink relay B |
| Scenario 1: Mobility between indirect (via a first relay UE) and indirect (via a second relay UE) (mobility in same base station) |
| Scenario 2: Mobility between indirect (via a first relay UE) and indirect (via a second relay UE) (mobility between base stations) |

In the case where the UE supports connection establishment with the base station through the sidelink relay in addition to direct connection establishment with the base station, the UE may perform a change of sidelink relay from a connection with one sidelink relay to a connection with another sidelink relay as shown in [Table 1]. This will be described as a sidelink relay change operation. An operation in which the UE changes from a connection through the sidelink relay A to a direct connection with the serving base station or an operation in which the UE changes from a direct connection with the serving base station to a connection through the sidelink relay A will also be described as the sidelink relay change operation. The sidelink relay change operation may be a change within the same serving base station or a change from the serving base station to the target base station. In the case of direct connection between the UE and the base station in the existing communication system, an operation in which the UE performs a change from a connection with the serving base station to a connection with the target base station may mean handover. In an embodiment of the disclosure, an operation of changing from a connection of the serving base station through the sidelink relay A to a direct connection with the target base station, an operation of changing from a connection with the serving base station to a connection of the target base station through the sidelink relay B, and an operation of changing from a connection of the serving base station through the sidelink relay A to a connection of the target base station through the sidelink relay B will also be described as the sidelink relay change operation.

The serving base station of the UE may control the connected mode mobility of the UE. For example, the serving base station may transmit configuration information instructing a Uu link monitoring and measurement report to the UE. The base station may transmit configuration information instructing a sidelink monitoring and measurement report to the UE. In the case where the UE is directly connected to the base station, the monitoring and measurement report instruction configuration information may be transmitted through RRC signaling of the Uu interface between the base station and the UE. In the case where the UE is connected to the base station through the sidelink relay, the monitoring and measurement report instruction configuration information may be relay-transmitted through RRC signaling between the base station and the UE via the sidelink relay. The serving base station may obtain a report result for monitoring/measurement of the Uu link or the sidelink of the UE through the direct connection from the UE or through the relay transmission of the sidelink relay. Even when connected directly to the base station or through the sidelink relay, the UE may be instructed to perform at least one handover among normal handover, conditional handover, and DAPS handover. When the UE is RRC-connected with the serving base station through the sidelink relay, the sidelink relay may perform an operation of relay-transmitting RRC signaling including the connected mode mobility control configuration of the UE or the handover indication between the UE and the serving base station. The RRC signaling for the connected mode mobility control configuration of the UE or the handover indication may be transmitted and received between the UE and the sidelink relay through PC5 SLRB configured between the UE and the sidelink relay. When the UE is directly connected with the serving base station, the target sidelink relay in the serving base station may obtain, through the serving base station, at least one or a combination of sidelink relay Uu relay RLC channel configuration information necessary for relay-transmitting signaling/data of the UE to perform a path change, and PC5 SRB/DRB configuration information with the UE. The UE that changes a path to the target sidelink relay by using at least one or a combination of the sidelink relay Uu relay RLC channel configuration information and the PC5 SRB/DRB configuration information with the UE may maintain the connection with the base station through the target sidelink relay and relay-transmit data/signaling transmission/reception.

In the case of supporting the sidelink relay, the serving base station and the neighboring base station may exchange, through an inter-node message, sidelink relay information managed by the base station and exchange, through an inter-node message, information about the target base station and the sidelink relay of the target base station for which the UE can perform handover and path change based on a Uu link measurement result and a sidelink measurement result reported by the UE for connected mode mobility of the UE. The serving base station and the neighboring base station may exchange, through an inter-node message, at least one or a combination of Uu capability of the UE, sidelink capability of the UE, Uu SRB/DRB configuration information of the UE, PC5 SRB/DRB configuration information of the UE, and PC5 SRB/DRB configuration information between the UE and the target base station, which are required for the UE to perform handover and path change to the target base station or the sidelink relay of the target base station and to establish connection with the target base station or the sidelink relay of the target base station.

FIG. 7 is a diagram illustrating an operation sequence of a UE that processes connected mode mobility of a UE according to an embodiment of the disclosure.

Referring to FIG. 7, in the case where a UE is authenticated to transmit and receive data/signaling with a base station through a sidelink relay, the UE may perform at least one operation among the mobility scenarios in [Table 1]. Upon receiving an RRCReconfiguration message indicating handover or sidelink relay change from a serving base station, at step 700 the UE may acquire, from handover or sidelink relay change indication configuration information in the RRCReconfiguration message, information indicating whether handover or sidelink relay change within the serving base station is instructed or handover or sidelink relay change within a neighboring base station is instructed.

If it is determined at step 701 that the configuration information instructs handover or sidelink relay change in the serving base station, at step 702 the UE may determine whether the configuration information instructs a direct connection with the serving base station or instructs a connection with the base station through the sidelink relay in the serving base station. In the case of the direct connection with the serving base station, step 703 may be performed. At the step 703, the UE may determine whether a PC5 direct link release procedure with the sidelink relay of the currently connected serving base station is required. The UE may determine to release PC5 SLRB configured for relay transmission of data/signaling bearer between the UE and the base station with the serving sidelink relay and then perform a procedure for releasing the PC5 SLRB with the sidelink relay. In the case of having to maintain PC5 direct link establishment and PC5 RRC establishment for the purpose of separate sidelink direct communication other than the purpose of relay transmission with the sidelink relay, the UE may determine to maintain configuration of the separate sidelink direct communication purpose. At step 704, the UE may obtain configuration information of at least one or a combination of a Uu L1 (PHY) entity, a Uu MAC entity, and a Uu RLC entity necessary for direct connection establishment with the serving base station from the base station and configure it with the base station. If it is determined at the step 702 that the configuration information instructs a connection with the base station through the sidelink relay in the serving base station, the UE may perform step 705. At the step 705, the UE may determine whether a PC5 direct link release procedure with the sidelink relay of the currently connected serving base station is required. The UE may determine to release PC5 SLRB configured for relay transmission of data/signaling bearer between the UE and the base station with the serving sidelink relay and then perform a procedure for releasing the PC5 SLRB with the sidelink relay. In the case of having to maintain PC5 direct link establishment and PC5 RRC establishment for the purpose of separate sidelink direct communication other than the purpose of relay transmission with the sidelink relay, the UE may determine to maintain configuration of the separate sidelink direct communication purpose. The UE may determine that a PC5 direct link establishment procedure with the target sidelink relay is required. The UE may configure PC5 SLRB for the purpose of relay transmission of data/signaling bearer between the UE and the base station with the target sidelink relay. The PC5 SLRB for relay transmission may be configured by acquiring configuration information of at least one or a combination of a PC5 L1 (PHY) entity, a PC5 MAC entity, and a PC5 RLC entity from the base station.

If it is determined at step 701 that the configuration information instructs handover or sidelink relay change in the target base station, at step 707 the UE may determine whether the configuration information instructs a direct connection with the target base station or instructs a connection with the base station through the sidelink relay in the target base station. In the case of the direct connection with the target base station, step 708 may be performed. At the step 708, the UE may determine whether connection is established through the sidelink relay of the serving base station. If it is determined at the step 708 that the UE is connected to the sidelink relay, the UE may determine at step 709 whether a PC5 direct link release procedure with the serving sidelink relay is required. The UE may determine to release PC5 SLRB configured for relay transmission of data/signaling bearer between the UE and the base station with the serving sidelink relay and then perform a procedure for releasing the PC5 SLRB with the sidelink relay. In the case of having to maintain PC5 direct link establishment and PC5 RRC establishment for the purpose of separate sidelink direct communication other than the purpose of relay transmission with the sidelink relay, the UE may determine to maintain configuration of the separate sidelink direct communication purpose. At step 710, the UE may perform an RRC connection establishment procedure with the target base station. At the step 710, the UE may perform a synchronization acquisition and random access procedure (at least one of contention free, contention-based, 2-step RACH or 4-step RACH) with the target base station, and perform a bearer setup procedure required for RRC connection establishment and data/signaling transmission and reception through direct connection with the target base station. The operation performed by the UE at the step 710 may correspond to a procedure in which the UE establishes a connection with the target base station and releases a connection with the serving base station upon general handover of Uu interface. That is, the UE may release the Uu SDAP entity and the Uu PDCP entity obtained from the RRC connection with the serving base station and establish a radio bearer with the target base station. If it is determined at the step 708 that the UE receives a handover indication to the target base station from direct connection with the serving base station, the UE may perform the operation of the step 710.

If it is determined at the step 707 that the configuration information instructs a connection with the base station through the sidelink relay in the target base station, the UE may perform step 711. At the step 711, the UE may determine whether connection is established through the sidelink relay of the serving base station. If it is determined at the step 711 that the UE is connected to the sidelink relay, the UE may determine at step 712 whether a PC5 direct link release procedure with the serving sidelink relay is required. The UE may determine to release PC5 SLRB configured for relay transmission of data/signaling bearer between the UE and the base station with the serving sidelink relay and then perform a procedure for releasing the PC5 SLRB with the sidelink relay. In the case of having to maintain PC5 direct link establishment and PC5 RRC establishment for the purpose of separate sidelink direct communication other than the purpose of relay transmission with the sidelink relay, the UE may determine to maintain configuration of the separate sidelink direct communication purpose.

At step 713, the UE may perform a PC5 direct link establishment procedure with the target sidelink relay of the target base station. At step 714, the UE may perform an RRC connection establishment procedure with the target base station by using the PC5 direct link establishment with the target sidelink relay. The UE may configure an RRC entity, a Uu SDAP entity, and a Uu PDCP entity of a data/signaling radio bearer between the UE and the target base station by performing the RRC establishment procedure with the target base station without performing a synchronization acquisition and random access procedures with the target base station. The UE may configure a PC5 L1 (PHY) entity, a PC5 MAC entity, and a PC5 RLC entity for relay transmission of a data/signaling radio bearer between the UE and the target base station with the target sidelink relay. At step 714, the UE may perform connection release with the serving base station, that is, the UE may release the Uu SDAP entity and the Uu PDCP entity obtained from the RRC connection with the serving base station. If it is determined at the step 711 that the UE is instructed to change the relay from the direct connection with the serving base station to the target sidelink relay of the target base station, the UE may perform operations of the steps 713 and 714.

FIG. 8 is a diagram illustrating an operation sequence of a UE, a serving sidelink relay terminal, and a base station that process connected mode mobility of a UE according to an embodiment of the disclosure.

Referring to FIG. 8, at step 801, a base station 830 may transmit, to a sidelink relay 820, an RRCReconfiguration message including measurement configuration and measurement report configuration for connected mode mobility management for a UE 800 that transmits and receives data/signaling with the base station 830 through a sidelink connection with the sidelink relay 820. In order to obtain information necessary for the measurement configuration and the measurement report configuration, the base station 830 may exchange at least one or a combination of information in [Table 2] with sidelink relays connected to a neighboring base station and a serving base station. The neighboring base station may also exchange this information with sidelink relays connected thereto.

TABLE 2

| the list relay UEs of neighboring cells(SL resource pool for discovery, SL carrier for discovery, relay code, relay UE identifier) the list of Uu carrier, frequency to measure neighboring cells PLMN, TA(tracking area identifier) |
| --- |

The RRCReconfiguration message of the step 801 may be mapped to a sidelink relay Uu relay RLC channel indicating that it is intended for the UE 800. At step 802, the sidelink relay 820 may transmit the RRCReconfiguration message to the UE 800 through a PC5 RLC channel with the UE 800 mapped to the sidelink relay Uu relay RLC channel. At the step 802, to be mapped to a signaling bearer (e.g., a bearer corresponding to RRC signaling) transmitted from the base station 830 (downlink) or transmitted to the base station 830 (uplink) between the UE 800 and the sidelink relay 820, the same sidelink signaling bearer as the sidelink RRC may be configured or a separate sidelink radio bearer (signaling or data) may be configured. At this time, if the same mode as the RLC mode corresponding to Uu RRC signaling, that is, the RLC mode of Uu RRC, is TM, the RLC mode of the sidelink radio bearer may be configured to TM. Similarly, if the RLC mode of Uu RRC is AM, the RLC mode of the sidelink radio bearer may be configured to AM, and if the RLC mode of Uu RRC is UM, the RLC mode of the sidelink radio bearer may be configured to UM. This is configuration for performing RLC mode processing of the same level as Uu RRC in the sidelink. At step 803, the UE 800 may acquire measurement configuration and measurement report configuration information included in the RRCReconfiguration message, and may perform operations according to the measurement configuration and measurement report configuration. The measurement configuration and measurement report configuration may include at least one or a combination of the following [Table 3].

TABLE 3

| The information of measurement configuration: at least one of Uu carrier/cell list to measure(e.g., meas config), SL resource pool list for discovery, SL carrier list for discovery, SL inter-carrier list of serving cell, SL carrier list of neighboring cells, |
| --- |

TABLE 3-continued relay UE information
The information of measurement metric(e.g., SL RSRP, Uu RSRP, Uu RSSI), the
information of measurement report metric(e.g., report event list, periodic report
configuration)
Relay UE information: Relay UE identifier, relay service code, User Info ID,
Relay UE L2 ID in discovery message, physical cell ID of its serving cell The UE 800 may perform at least one or a combination of measurement of the Uu interface and measurement of the sidelink interface based on the measurement configuration and the measurement report configuration of the step 803. In the case of performing measurement of the sidelink interface, if the UE 800 is configured to monitor a sidelink relay discovery message, perform measurement, and report it, the UE 800 may be configured to report a physical cell ID of the serving base station (or serving cell) of the sidelink relay acquired from the sidelink relay discovery message. At step 804, the UE 800 may transmit an RRC measurement report message to the base station 830. The RRC measurement report message of the UE 800 may be relay-transmitted to the base station 830 through the sidelink relay 820 at step 805. At the step 804, the UE 800 and the sidelink relay 820 may transmit and receive the RRC measurement report on the sidelink by using the PC5 SLRB configured to be mapped to the Uu SRB of the RRC measurement report, and at the step 805, the sidelink relay 820 may transmit the RRC measurement report to the base station 830 in the sidelink relay Uu RLC channel mapped to the RLC channel of the PC5 SLRB. The RRC measurement report message of the UE 800 may include at least one or a combination of a measurement result for the Uu interface and a measurement result for the sidelink interface. The measurement result for the sidelink interface may include sidelink relay information, and information including at least one or a combination of a sidelink relay identifier (at least one or combination of relay code, relay layer-2 ID, and relay identifier), a measurement result value (e.g., SL-RSRP) for the sidelink relay, and a physical cell ID of serving cell/base station of the sidelink relay may be reported. The base station 830 may manage the connected mode mobility of the UE 800, based on the RRC measurement report of the UE 800, information obtained from neighboring base stations by the base station 830, information obtained from a core network by the base station 830, and the like. For example, it may determine a need for handover or sidelink relay change of the UE 800. In the disclosure, a connection change in which the UE 800 is directly connected to the serving base station or the target base station is instructed as a handover, and a connection change in which the UE 800 is connected to the sidelink relay in the serving base station or the target base station is instructed as a sidelink relay change.

In the case of instructing the handover or the sidelink relay change, at step 806 the base station 830 may transmit, to the UE 800, an RRCReconfiguration message including at least one or a combination of configuration information (including at least one of Uu RRC, Uu PDCP, Uu SDAP, Uu RLC, Uu MAC, Uu L1 (PHY), synchronization configuration, or random access configuration) required for the UE 800 to establish a connection with a new base station or configuration information (including at least one of PC5 RLC, PC5 MAC, or PC5 L1 (PHY) configuration) required to establish a connection with a new sidelink relay. For example, in the case where the UE 800 needs to perform the sidelink relay change to the sidelink relay of a new base station, the information transmitted by the base station 830 in RRCReconfiguration may include at least one or a combination of Uu RRC entity configuration information, Uu PDCP entity configuration information, and Uu SDAP entity configuration information with the target base station, and PC5 RLC entity configuration information, PC5 MAC entity configuration information, and PC5 L1 (PHY) entity configuration information with the sidelink relay of the target base station. According to an embodiment, the sidelink relay 820 may transmit the RRCReconfiguration message including information of handover indication or sidelink relay change indication to the UE 800 through a sidelink RLC channel at step 807. Based on the handover indication or sidelink relay change indication of the RRCReconfiguration message received from the base station 830, the UE 800 may access and establish a connection with a new target base station or a new sidelink relay at step 809.

Based on the handover indication or sidelink relay change indication of the RRCReconfiguration message received from the base station 830, at the step 809, the UE 800 may perform at least one or a combination of a release of PC5 direct connection with the serving sidelink relay (release of PC5 L1 (PHY) entity configuration, PC5 MAC entity configuration, PC5 RLC entity configuration for the purpose of data/signaling transmission between the UE and the base stations through the sidelink relay 820) or a release of Uu connection with the serving base station 830. In the case where the UE 800 performs a sidelink relay change to another sidelink relay in the serving base station 830, the UE 800 may maintain the Uu RRC entity, Uu PDCP entity, and Uu SDAP entity configuration with the serving base station 830 and use it in data/signaling transmission and reception with the serving base station 830 even when connected to a new sidelink relay.

Next, referring to FIGS. 9 to 10, an operation of releasing the sidelink connection with the sidelink relay at the step 809 of FIG. 8 will be described in the case where the UE receives a sidelink relay change indication to another sidelink relay in the serving base station, receives a sidelink relay change indication from the sidelink relay connection to the direct connection to the base station, receives a sidelink relay change indication from the sidelink relay connection to the direct connection to the target base station, or receives a sidelink relay change indication to the sidelink relay of another base station.

FIG. 9 is a diagram illustrating an operation sequence of a UE, a serving sidelink relay terminal, and a base station that process connected mode mobility of a UE according to an embodiment of the disclosure.

FIG. 9 illustrates an operation of releasing the sidelink PC5 connection between a UE 900 and a serving sidelink relay 910 in the case where the UE 900 no longer needs data/signaling transmission and reception with a base station 920 through the serving sidelink relay 910. Based on the handover indication or the sidelink relay change indication of the RRCReconfiguration message received at the step 807 of FIG. 8, the UE 900 may determine that it is necessary to release the PC5 connection configured for sidelink relay use with the sidelink relay 910. The UE 900 may determine at step 901 that there is a need to release the PC5 connection with the sidelink relay 910, and may perform a PC5 connection release procedure with the sidelink relay 910 by transmitting a PC5 connection release procedure request message to the sidelink relay 910 at step 902. The PC5 connection release procedure performed by the UE 900 and the sidelink relay 910 at the step 902 may include one of the following procedures in [Table 4] or [Table 5].

relay Uu RLC channel configured for data/signaling relay transmission between the UE 1000 and the base station 1020 or deletion of configuration information of the corresponding UE 1000 since the UE 1000 performs handover or sidelink relay change. Then the sidelink relay 1010 may determine that it is necessary to release the PC5 connection configured for the purpose of sidelink relay with the UE 1000.

TABLE 4

This is a procedure for releasing the PC5 connection configured for sidelink relay using PC5-S signaling in the V2X layer of the UE 900 and the sidelink relay 910.
At the step 901, the UE 900 may transmit an indication indicating the need to release the PC5 connection established for release to its V2X layer. Upon determining that it is necessary to perform the PC5 connection release procedure, the V2X layer may transmit PC5-S signaling informing a direct link release request to a V2X layer of the sidelink relay 910, and may receive PC5-S signaling informing a direct link release accept from the V2X layer of the sidelink relay 910. The UE 900 may transmit, to the sidelink relay 910, PC5-S signaling in which a PC5 signaling protocol cause value "relay path switch" or "direct communication to the target UE no longer needed" defined for sidelink relay use is configured. Each V2X layer of the UE 900 and the sidelink relay 910 may deliver an indication of releasing the PC5-RRC connection to its own AS layer. Then, based on this indication, each AS layer of the UE 900 and the sidelink relay 910 recognizes the release of the PC5 RRC connection, and may release at least one or a combination of SLRB configuration configured for the corresponding PC5 RRC, SLRB configuration configured for relay of the UE 900, and context and sidelink resource information of the UE 900 and the sidelink relay 910. The sidelink relay 910 may release information of the UE 900 in the sidelink relay Uu relay RLC channel.

TABLE 5

This is a procedure for releasing the PC5 connection configured for sidelink relay in the PC5 RRC layer of the UE 900 and the sidelink relay 910. To this end, as a message used in the PC5 RRC layer, RRCReconfigurationSidelink may contain "PC5 RRC release" cause.
The UE 900 may transmit RRCReconfigurationSidelink with "PC5 RRC release" to the sidelink relay 910. In response, the sidelink relay 910 may transmit an RRCReconfigurationCompleteSidelink message to the UE 900. The UE 900 and the sidelink relay 910 may deliver, to their respective V2X layers, indication information indicating that the PC5 RRC connection has been released. The V2X layers of the UE 900 and the sidelink relay 910 may perform a direct link release procedure using PC5-S signaling.
The UE 900 and the sidelink relay 910 recognize the release of the PC5 RRC connection, and may release at least one or a combination of SLRB configuration configured for the corresponding PC5 RRC, SLRB configuration configured for relay of the UE 900, and context and sidelink resource information of the UE 900 and the sidelink relay 910. The sidelink relay 910 may release information of the UE 900 in the sidelink relay Uu relay RLC channel.

FIG. 10 is a diagram illustrating an operation sequence of a UE, a serving sidelink relay terminal, and a base station that process connected mode mobility of a UE according to another embodiment of the disclosure.

FIG. 10 illustrates an operation of releasing the sidelink PC5 connection between a UE 1000 and a serving sidelink relay 1010 in the case where the UE 1000 no longer needs data/signaling transmission and reception with a base station 1020 through the serving sidelink relay 1010. The sidelink relay 1010 may acquire, from the base station 1020, configuration information instructing release of the sidelink The sidelink relay 1010 may determine at step 1001 that there is a need to release the PC5 connection with the UE 1000, and may perform a PC5 connection release procedure with the UE 1000 by transmitting a PC5 connection release procedure request message to the UE 1000 at step 1002. The PC5 connection release procedure performed by the UE 1000 and the sidelink relay 1010 at the step 1002 may include one of the following procedures in [Table 6] or [Table 7].

TABLE 6

This is a procedure for releasing the PC5 connection configured for sidelink relay using PC5-S signaling in the V2X layer of the UE 1000 and the sidelink relay 1010.
At the step 1001, the sidelink relay 1010 may transmit an indication indicating the need to release the PC5 connection established for release to its V2X layer.

TABLE 6-continued

Upon determining that it is necessary to perform the PC5 connection release
procedure, the V2X layer may transmit PC5-S signaling informing a direct link
release request to a V2X layer of the UE 1000, and may receive PC5-S signaling
informing a direct link release accept from the V2X layer of the UE 1000. The
sidelink relay 1010 may transmit, to the UE 1000, PC5-S signaling in which a PC5
signaling protocol cause value "relay path switch" or "direct communication to the
target UE no longer needed" defined for sidelink relay use is configured. Each V2X
layer of the UE 1000 and the sidelink relay 1010 may deliver an indication of
releasing the PC5-RRC connection to its own AS layer. Then, based on this
indication, each AS layer of the UE 1000 and the sidelink relay 1010 recognizes the
release of the PC5 RRC connection, and may release at least one or a combination
of SLRB configuration configured for the corresponding PC5 RRC, SLRB
configuration configured for relay of the UE 1000, and context and sidelink
resource information of the UE 1000 and the sidelink relay 1010. The sidelink relay
1010 may release information of the UE 1000 in the sidelink relay Uu relay RLC
channel.

TABLE 7

This is a procedure for releasing the PC5 connection configured for sidelink
relay in the PC5 RRC layer of the UE 1000 and the sidelink relay 1010. To this
end, as a message used in the PC5 RRC layer, RRCReconfigurationSidelink may
contain "PC5 RRC release" cause.
The sidelink relay 1010 may transmit RRCReconfigurationSidelink with "PC5
RRC release" to the UE 1000. In response, the UE 1000 may transmit an
RRCReconfigurationCompleteSidelink message to the sidelink relay 1010. The UE
1000 and the sidelink relay 1010 may deliver, to their respective V2X layers,
indication information indicating that the PC5 RRC connection has been released.
The V2X layers of the UE 1000 and the sidelink relay 1010 may perform a direct
link release procedure using PC5-S signaling.
The UE 1000 and the sidelink relay 1010 recognize the release of the PC5 RRC
connection, and may release at least one or a combination of SLRB configuration
configured for the corresponding PC5 RRC, SLRB configuration configured for
relay of the UE 1000, and context and sidelink resource information of the UE
1000 and the sidelink relay 1010. The sidelink relay 1010 may release information
of the UE 1000 in the sidelink relay Uu relay RLC channel.

In the embodiment of FIG. 8, an operation for the serving sidelink relay 820 and the serving base station 830 of the UE 800 to process handover or sidelink relay change of the UE 800 will be described with reference to FIGS. 11A and 11B.

FIG. 11A is a diagram illustrating an operation sequence of a serving sidelink relay terminal and a base station that process connected mode mobility of a UE according to an embodiment of the disclosure.

FIG. 11A may be performed as an operation in which the serving base station 830 transmits the RRCReconfiguration message indicating handover or sidelink relay change to the UE 800 and notifies this to the serving sidelink relay 820, and as an operation in which the sidelink relay 820 releases the sidelink established for relay transmission with the UE 800 that is no longer needed. As an embodiment, FIG. 11A may be performed when the serving base station 830 transmits the RRCReconfiguration message to the UE 800 and receives an RRCReconfigurationComplete message notifying the completion of handover or sidelink relay change from the UE 800 or receives a corresponding message from another base station. In the embodiment of FIG. 11A, the serving base station 830 may separately deliver information about the handover or sidelink relay change of the UE 800 to the sidelink relay 820 while transmitting the RRCReconfiguration message to the UE 800.

Referring to FIG. 11A, at step 1101, the base station 1110 may transmit, to the sidelink relay 1100, an RRCReconfiguration message including at least one or a combination of information notifying that the UE performs handover or sidelink relay change, and information notifying release of information configured for signaling/data relay between the UE and the base station. The RRCReconfiguration message may include at least one or a combination of identification information of the UE to be released from relay information by the sidelink relay 1100, and sidelink relay Uu relay RLC channel information for the UE. At step 1102, the sidelink relay 1100 may transmit an RRCReconfigurationComplete message to the base station 1110. At step 1103, the sidelink relay 1100 may perform a PC5 direct link release procedure with the UE if needed. For example, the sidelink relay 1100 may perform the PC5 direct link release procedure as shown in FIG. 9 or FIG. 10. At the step 1103, the sidelink relay 1100 may release bearer configuration information configured for relay between the UE and the base station 1110. For example, information of the corresponding UE may be deleted in sidelink relay Uu relay RLC channel configuration. At the step 1103, the sidelink relay 1100 may report packet forwarding status information to the base station 1110 about packets being processed for relay transmission to the UE. The sidelink relay 1100 may transmit sidelink packets and Uu packets between the UE and the base station to the UE and the base station 1110, respectively, or may delete (discard) sidelink packets and Uu packets that are no longer needed for relay transmission.

FIG. 11B is a diagram illustrating an operation sequence of a serving sidelink relay terminal and a base station that process connected mode mobility of a UE according to another embodiment of the disclosure.

FIG. 11B may be performed as an operation in which the sidelink relay 820 releases the sidelink established for relay transmission with the UE 800 that is no longer needed, and an operation in which the sidelink relay 820 notifies the serving base station 830 that relay transmission to the UE 800 is no longer performed. As an embodiment, the operation of FIG. 11B may be performed after the sidelink relay 820 releases a PC5 direct link release procedure for sidelink relay with the UE 800 and PC5 SLRB configuration.

Referring to FIG. 11B, at step 1151, the sidelink relay 1150 may determine that PC5 direct link release and PC5 SLRB release for sidelink relay with the UE are necessary. At step 1152, the sidelink relay 1500 may perform a PC5 direct link release procedure with the UE if needed. For example, the sidelink relay 1150 may perform the PC5 direct link release procedure as shown in FIG. 9 or FIG. 10. At the step 1152, the sidelink relay 1500 may release bearer configuration information configured for relay between the UE and the base station 1160. For example, information of the corresponding UE may be deleted in sidelink relay Uu relay RLC channel configuration. At the step 1152, the sidelink relay 1150 may report packet forwarding status information to the base station 1160 about packets being processed for relay transmission to the UE. The sidelink relay 1150 may transmit sidelink packets and Uu packets between the UE and the base station to the UE and the base station 1160, respectively, or may delete sidelink packets and Uu packets that are no longer needed for relay transmission. At step 1153, the sidelink relay 1150 may transmit, to the base station 1160, a SidelinkUEInformation message indicating that relay transmission to the UE is no longer performed. The SidelinkUEInformation message may be transmitted for the purpose of notifying that the sidelink relay Uu relay RLC channel configured for signaling/data relay between the UE and the base station 1160 is released.

FIG. 12A is a diagram illustrating an operation sequence of a UE, a target sidelink relay terminal, and a base station that process connected mode mobility of a UE according to an embodiment of the disclosure.

The embodiment of FIG. 12A shows, in a scenario in which a UE 1200 performs a sidelink relay change to a sidelink relay in the same serving base station 1230, procedures of an operation in which the UE 1200 receives, from the base station 1230, a sidelink relay change indication to a target sidelink relay 1220 and then performs a PC5 direct link connection establishment for connection with the base station 1230 through the target sidelink relay 1220 and a sidelink SLRB configuration for relay, and an operation in which the target sidelink relay 1220 obtains, from the base station 1230, sidelink relay configuration information necessary for relay transmission of signaling/data between the UE 1200 and the base station 1230.

Referring to FIG. 12A, at step 1201, the UE 1200 may acquire an RRCReconfiguration message including sidelink relay change indication or handover indication information from the serving base station 1230 while transmitting and receiving signaling/data with the serving base station 1230 through a connection with a serving sidelink relay or a direct connection with the serving base station. The RRCReconfiguration message of the step 1201 may be delivered to the UE 1200 through the serving sidelink relay or directly transmitted from the serving base station 1230. At step 1202, the UE 1200 may determine that there is a need of a connection to the new sidelink relay 1220 based on the indication acquired at the step 1201.

At step 1203, the UE 1200 may perform a PC5 direct link connection establishment procedure with the target sidelink relay 1220. By triggering of the UE 1200 receiving the RRCReconfiguration message at the step 1201, the UE 1200 and the sidelink relay 1220 may perform a PC5 direct link setup establishment procedure using PC5-S signaling of the V2X layer. The UE 1200 may set the PC5-S signaling protocol cause to "relay path switch" or "link setup for indirect communication" and transmit a direct link setup request PC5-S signaling to the target sidelink relay 1220. If the UE 1200 and the target sidelink relay 1220 have already performed the PC5 direct link setup establishment procedure for normal sidelink data transmission and reception, not for relay transmission, and maintain a PC5 direct link connection, the UE 1200 and the target sidelink relay 1220 may use the existing PC5 direct link connection for relay transmission. In this case, the UE 1200 may set the PC5-S signaling protocol cause to "relay path switch" or "link setup for indirect communication" and transmit direct link modification request PC5-S signaling to the target sidelink relay 1220.

As another embodiment, in the case of using an already established PC5 direct link for relay between the UE 1200 and the target sidelink relay 1220, the UE 1200 may transmit, to the target sidelink relay 1220, PC5 RRC signaling (e.g., RRCReconfigurationSidelink) indicating a need of PC5 SLRB configuration for relay. In addition, at the step 1203, the UE 1200 and the target sidelink relay 1220 may also perform an SLRB configuration procedure using sidelink RRC signaling.

As another embodiment, the UE 1200 and the target sidelink relay 1220 may not perform the sidelink SLRB configuration procedure at the step 1203, and instead may perform the sidelink SLRB configuration procedure after acquiring sidelink SLRB configuration information for relay from the base station 1230.

Through the procedure of the step 1203, the target sidelink relay 1220 may determine that data/signaling needs to be relay-transmitted between the UE 1200 and the base station 1230, and may acquire information of the UE 1200. At step 1205, the target sidelink relay 1220 may transmit, to the base station 1230, a SidelinkUEInformation message reporting that relay transmission of the UE 1200 is needed.

The SidelinkUEInformation message of the step 1205 may include at least one or a combination of identification information of the UE 1200, information indicating a need of SLRB configuration in relay transmission for the UE 1200, and sidelink transmission resource request information necessary for relay transmission for the UE 1200. The identification information of the UE 1200 used at the step 1205 may include the destination layer-2 ID of the UE 1200 or the unicast link ID of the UE 1200 and the target sidelink relay 1220, and the UE identification information may be used to distinguish the UE 1200 in a relay adaptation protocol (RAP) sublayer of the base station 1230 and the target sidelink relay 1220. In the case of using the destination layer-2 ID as the identification information of the UE 1200, the destination layer-2 ID may be used in relay transmission through the UE 1200 and a previous serving sidelink relay. If it is determined that the destination layer-2 ID needs to be updated in the case of being connected with the target sidelink relay 1220, the UE 1200 may perform a destination layer-2 ID update procedure with the target sidelink relay 1220.

At step 1206, the base station 1230 may transmit relay configuration information required for data/signaling relay transmission between the UE 1200 and the base station 1230 to the target sidelink relay 1220 and transmit RAP sublayer configuration information. When the base station 1230 transmits the relay configuration information or the RAP sublayer configuration information to the target sidelink relay 1220, the identification information of the UE 1200 reported in the SidelinkUEInformation message of the step 1205 by the target sidelink relay 1220 may be contained. At step 1208, the target sidelink relay 1220 may transmit an RRCReconfigurationComplete message to the base station 1230 as a response to the RRCReconfiguration message of the step 1206. In addition, the base station 1230 may transmit sidelink SLRB configuration information for relay transmission to the target sidelink relay 1220 at the step 1206, which may be the same as sidelink SLRB configuration information that the UE 1200 is using for relay transmission with the previous serving sidelink relay.

As another embodiment, in the case where the base station 1230 decides to change the sidelink SLRB configuration information for relay transmission between the target sidelink relay 1220 and the UE 1200, the base station 1230 may transmit sidelink SLRB configuration information for sidelink relay transmission to the target sidelink relay 1220 and the UE 1200. At step 1207, the UE 1200 and the target sidelink relay 1220 may exchange PC5 RRC signaling to check or update the sidelink SLRB configuration information for relay transmission. Checking the sidelink SLRB configuration information for relay transmission may correspond to an operation in which the UE 1200 configures sidelink SLRB information for relay transmission with the target sidelink relay 1220 based on sidelink SLRB configuration information for relay transmission that the UE 1200 has configured with the previous serving sidelink relay and is in use. Updating the sidelink SLRB configuration information for relay transmission between the UE 1200 and the target sidelink relay 1220 may correspond to an operation of configuring sidelink SLRB information for relay transmission between the UE 1200 and the target sidelink relay 1220 based on sidelink SLRB configuration information newly acquired from the base station 1230. When sidelink SLRB configuration for relay transmission between the UE 1200 and the target sidelink relay 1220 is completed, the UE 1200 may transmit an RRCReconfigurationComplete message to the base station 1230 through the target sidelink relay 1220 at step 1209 for the purpose of reporting the sidelink relay change completion.

In the case where the UE 1200 performs a sidelink relay change procedure to the target sidelink relay 1220 while performing direct connection with the base station 1230, the UE 1200 may release Uu L1 (PHY) entity configuration, Uu MAC entity configuration, and Uu RLC entity configuration information of Uu DRB/SRB that is configured for direct connection with the base station 1230 but is not necessary for relay transmission with the target sidelink relay 1220. Unless a change is instructed by the base station 1230, the UE 1200 may use the Uu PDCP entity configuration, Uu SDAP entity configuration, and Uu RRC entity configuration information with the base station 1230 even when connected with the target sidelink relay 1220. The UE 1200 may configure PC5 L1 (PHY) entity configuration, PC5 MAC entity configuration, and PC5 RLC entity configuration information required for relay transmission with the target sidelink relay 1220.

In the case where the UE 1200 performs a sidelink relay change procedure to the target sidelink relay 1220 while performing connection with the base station through the serving sidelink relay, the UE 1200 may perform an operation of releasing PC5 direct link and connection establishment and SLRB configuration for relay transmission with the previous serving sidelink relay that are no longer needed. The PC5 direct link and connection establishment and SLRB configuration, which should be used by the UE 1200 and the previous serving sidelink relay for separate sidelink direct data transmission and reception, not for relay transmission, may continue to be used without being released. The operation procedure performed by the UE 1200 with previous serving sidelink relay to release the PC5 direct link and connection establishment and SLRB configuration for relay transmission that are no longer needed is the same as the embodiment of FIG. 9 or FIG. 10. The previous serving sidelink relay may release RAP sublayer configuration information and PC5 SLRB configuration information configured for relay transmission of the UE 1200, and the operation procedures performed by the previous serving sidelink relay with the UE 1200 and the serving base station 1230 are as shown in FIGS. 9 and 10 and FIGS. 11A and 11B, respectively.

FIG. 12B is a diagram illustrating an operation sequence of a UE, a target sidelink relay terminal, and a base station that process connected mode mobility of a UE according to another embodiment of the disclosure.

The embodiment of FIG. 12B shows, in a scenario in which a UE 1250 performs a sidelink relay change to a sidelink relay in the same serving base station 1280, procedures of an operation in which when the UE 1250 receives a sidelink relay change indication to a target sidelink relay 1270 from the base station 1280 and when the target sidelink relay 1270 obtains configuration information necessary for PC5 direct link establishment for sidelink relay transmission with the UE 1250 from the base station 1280, the target sidelink relay 1270 performs a PC5 direct link connection establishment for connection with the UE 1250 and the base station 1280 and a sidelink SLRB configuration for relay, and an operation in which the target sidelink relay 1270 obtains, from the base station 1280, sidelink relay configuration information necessary for relay transmission of signaling/data between the UE 1250 and the base station 1280.

Referring to FIG. 12B, at step 1251, the UE 1250 may acquire an RRCReconfiguration message including sidelink relay change indication or handover indication information from the serving base station 1280 while transmitting and receiving signaling/data with the serving base station 1280 through a connection with a serving sidelink relay or a direct connection with the serving base station. The RRCReconfiguration message of the step 1251 may be delivered to the UE 1250 through the serving sidelink relay or directly transmitted from the serving base station 1280. At step 1252, the UE 1250 may determine that there is a need of a connection to the new sidelink relay 1270 based on the indication acquired at the step 1251. At step 1253, the target sidelink relay 1270 may acquire, from the base station 1280, at least one or a combination of information of the UE 1250, relay configuration information necessary for relay transmission between the base station 1280 and the UE 1250, and RAP sublayer configuration information, may determine that data/signaling needs to be relay-transmitted between the UE 1250 and the base station 1280, and may determine that PC5 direct link connection establishment for relay transmission between the UE 1250 and the base station 1280 is necessary. The identification information of the UE 1250 obtained from the base station 1280 by the target sidelink relay 1270 at the step 1253 may include at least one or a combination of the RNTI of the UE 1250 and the destination layer-2 ID of the UE 1250. The destination layer-2 ID of the UE 1250 may be used in relay transmission through the UE 1250 and the previous serving sidelink relay. If it is determined that the destination layer-2 ID needs to be updated when connected to the target sidelink relay 1270, the UE 1250 may perform a destination layer-2 ID update procedure with the target sidelink relay 1270.

In addition, the base station 1280 may transmit sidelink SLRB configuration information for relay transmission to the target sidelink relay 1270 at the step 1253, which may be the same as sidelink SLRB configuration information that the UE 1250 is using for relay transmission with the previous serving sidelink relay. As another embodiment, in the case where the base station 1280 decides to change the sidelink SLRB configuration information for relay transmission between the target sidelink relay 1720 and the UE 1250, the base station 1280 may transmit sidelink SLRB configuration information for sidelink relay transmission to the target sidelink relay 1270 and the UE 1250.

As another embodiment, an operation in which the base station 1280 transmits the sidelink SLRB configuration information for sidelink relay transmission to the target sidelink relay 1270 and the UE 1250 may be performed after the UE 1250 and the target sidelink relay 1270 complete PC5 direct link establishment required for relay transmission and the SidelinkUEInformation message is received for the purpose of requesting the base station 1280 to allocate PC5 SLRB configuration information for sidelink relay transmission.

At step 1254, the target sidelink relay 1270 may transmit an RRCReconfigurationComplete message to the base station 1280 as a response.

At step 1255, the target sidelink relay 1270 may perform a PC5 direct link connection establishment procedure with the UE 1250. By triggering of the target sidelink relay 1270 receiving the RRCReconfiguration message at the step 1253, the UE 1250 and the target sidelink relay 1270 may perform a PC5 direct link setup establishment procedure using PC5-S signaling of the V2X layer. The target sidelink relay 1270 may set the PC5-S signaling protocol cause to "relay path switch" or "link setup for indirect communication" and transmit a direct link setup request PC5-S signaling to the UE 1250. If the UE 1250 and the target sidelink relay 1270 have already performed the PC5 direct link setup establishment procedure for normal sidelink data transmission and reception, not for relay transmission, and maintain a PC5 direct link connection, the UE 1250 and the target sidelink relay 1270 may use the existing PC5 direct link connection for relay transmission. In this case, the target sidelink relay 1270 may set the PC5-S signaling protocol cause to "relay path switch" or "link setup for indirect communication" and transmit direct link modification request PC5-S signaling to the UE 1250.

As another embodiment, in the case of using an already established PC5 direct link for relay between the UE 1250 and the target sidelink relay 1270, the target sidelink relay 1270 may transmit, to the UE 1250, PC5 RRC signaling (e.g., RRCReconfigurationSidelink) indicating a need of PC5 SLRB configuration for relay. In addition, at the step 1255, the UE 1250 and the target sidelink relay 1270 may also perform an SLRB configuration procedure using sidelink RRC signaling. As another embodiment, the UE 1250 and the target sidelink relay 1270 may not perform the sidelink SLRB configuration procedure at the step 1255, and instead may perform the sidelink SLRB configuration procedure after acquiring sidelink SLRB configuration information for relay from the base station 1280.

At step 1256, the target sidelink relay 1270 may transmit, to the base station 1280, a SidelinkUEInformation message including at least one or a combination of a notification of PC5 direct link connection establishment for relay transmission with the UE 1250, a notification of a need for PC5 SLRB configuration for relay transmission with the UE 1250, sidelink transmission resource request information required for relay transmission to the UE 1250, and a notification of identification information of the UE 1250. The identification information of the UE 1250 used at the step 1256 may include the destination layer-2 ID of the UE 1250 or the unicast link ID of the UE 1250 and the target sidelink relay 1270, and the UE identification information may be used to distinguish the UE 1250 in a relay adaptation protocol (RAP) sublayer of the base station 1280 and the target sidelink relay 1270. In the case of using the destination layer-2 ID as the identification information of the UE 1250, the destination layer-2 ID may be used in relay transmission through the UE 1250 and a previous serving sidelink relay. If it is determined that the destination layer-2 ID needs to be updated in the case of being connected with the target sidelink relay 1270, the UE 1250 may perform a destination layer-2 ID update procedure with the target sidelink relay 1270. Upon receiving the SidelinkUEInformation message including a sidelink relay connection establishment report, information about the UE 1250 connected to the target sidelink relay 1270 for sidelink relay connection, or the like from the target sidelink relay 1270 at the step 1256, the base station 1280 may determine whether the target sidelink relay 1270 and the UE 1250 need the PC5 SLRB configuration information for sidelink relay transmission. At step 1257, the base station 1280 may transmit relay configuration information required for data/signaling relay transmission between the UE 1250 and the base station 1280 to the target sidelink relay 1270 and transmit RAP sublayer configuration information. When the base station 1280 transmits the relay configuration information or the RAP sublayer configuration information to the target sidelink relay 1270, the identification information of the UE 1250 reported in the SidelinkUEInformation message of the step 1256 by the target sidelink relay 1270 may be contained. At step 1258, the target sidelink relay 1270 may transmit an RRCReconfigurationComplete message to the base station 1280 as a response to the RRCReconfiguration message of the step 1257. In addition, the base station 1280 may transmit sidelink SLRB configuration information for relay transmission to the target sidelink relay 1270 at the step 1257, which may be the same as sidelink SLRB configuration information that the UE 1250 is using for relay transmission with the previous serving sidelink relay.

As another embodiment, in the case where the base station 1280 decides to change the sidelink SLRB configuration information for relay transmission between the target sidelink relay 1270 and the UE 1250, the base station 1280 may transmit sidelink SLRB configuration information for sidelink relay transmission to the target sidelink relay 1270 and the UE 1250. At step 1259, the UE 1250 and the target sidelink relay 1270 may exchange PC5 RRC signaling to check or update the sidelink SLRB configuration information for relay transmission. Checking the sidelink SLRB configuration information for relay transmission may correspond to an operation in which the UE 1250 configures sidelink SLRB information for relay transmission with the target sidelink relay 1270 based on sidelink SLRB configuration information for relay transmission that the UE 1250 has configured with the previous serving sidelink relay and is in use. Updating the sidelink SLRB configuration information for relay transmission between the UE 1250 and the target sidelink relay 1270 may correspond to an operation of configuring sidelink SLRB information for relay transmission between the UE 1250 and the target sidelink relay 1270 based on sidelink SLRB configuration information newly acquired from the base station 1280. When sidelink SLRB configuration for relay transmission between the UE 1250 and the target sidelink relay 1270 is completed, the UE 1250 may transmit an RRCReconfigurationComplete message to the base station 1280 through the target sidelink relay 1270 at step 1260 for the purpose of reporting the sidelink relay change completion.

In the case where the UE 1250 performs a sidelink relay change procedure to the target sidelink relay 1270 while performing direct connection with the base station 1280, the UE 1250 may release Uu L1 (PHY) entity configuration, Uu MAC entity configuration, and Uu RLC entity configuration information of Uu DRB/SRB that is configured for direct connection with the base station 1280 but is not necessary for relay transmission with the target sidelink relay 1270. Unless a change is instructed by the base station 1280, the UE 1250 may use the Uu PDCP entity configuration, Uu SDAP entity configuration, and Uu RRC entity configuration information with the base station 1280 even when connected with the target sidelink relay 1270. The UE 1250 may configure PC5 L1 (PHY) entity configuration, PC5 MAC entity configuration, and PC5 RLC entity configuration information required for relay transmission with the target sidelink relay 1270.

In the case where the UE 1250 performs a sidelink relay change procedure to the target sidelink relay 1270 while performing connection with the base station through the serving sidelink relay, the UE 1250 may perform an operation of releasing PC5 direct link and connection establishment and SLRB configuration for relay transmission with the previous serving sidelink relay that are no longer needed. The PC5 direct link and connection establishment and SLRB configuration, which should be used by the UE 1250 and the previous serving sidelink relay for separate sidelink direct data transmission and reception, not for relay transmission, may continue to be used without being released. The operation procedure performed by the UE 1250 with previous serving sidelink relay to release the PC5 direct link and connection establishment and SLRB configuration for relay transmission that are no longer needed is the same as the embodiment of FIG. 9 or FIG. 10. The previous serving sidelink relay may release RAP sublayer configuration information and PC5 SLRB configuration information configured for relay transmission of the UE 1250, and the operation procedures performed by the previous serving sidelink relay with the UE 1250 and the serving base station 1280 are as shown in FIGS. 9 and 10 and FIGS. 11A and 11B, respectively.

FIG. 13 is a diagram illustrating an operation sequence of a UE and a base station that process connected mode mobility of a UE according to an embodiment of the disclosure.

FIG. 13 illustrates a sidelink relay change procedure of a UE in a scenario in which the UE is directly connected to a serving base station while transmitting and receiving data/signaling with a base station through a relay connection of a sidelink relay.

Referring to FIG. 13, at step 1301, a UE 1300 may receive, from a serving base station 1340, an RRCReconfiguration message indicating a sidelink relay change from relay connection of a sidelink relay to a direct connection to the serving base station 1340. At step 1302, the UE 1300 may determine a sidelink relay change based on the RRCReconfiguration message of the step 1301 and determine to perform a direct connection procedure to the serving base station 1340. The UE may perform synchronization acquisition and random access procedures with the serving base station 1340 and, based on the configuration information of the RRCReconfiguration message of the step 1301, process Uu RRC configuration information, cell group configuration information, etc. necessary for direct connection with the serving base station 1340. For example, based on the Uu L1 (PHY) entity configuration information, Uu MAC entity configuration information, and Uu RLC entity configuration information for direct connection with the serving base station 1340, the UE may configure a Uu L1 entity, a Uu MAC entity, and a Uu L1 entity with the serving base station 1340. In the case of performing the random access procedure for the serving base station 1340, the UE 1300 may perform at least one or a combination of a contention free random access procedure, a contention-based random access procedure, a 2-step random access procedure, and a 4-step random access procedure. Even in the case of transmitting and receiving data/signaling with the serving base station 1340 through a relay connection with the sidelink relay, the UE 1300 may maintain the existing entity configuration information and use it for data/signaling transmission and reception through a direct connection with the base station 1340 if the serving base station 1340 does not allocate the Uu RRC entity configuration information, the Uu SDAP entity configuration information, and the Uu PDCP entity configuration information changed through the RRCReconfiguration message of the step 1301, since it has already configured the Uu RRC entity, the Uu SDAP entity, and the Uu PDCP with the serving base station 1340. At step 1303, the UE 1300 may transmit an RRCReconfiguration-Complete message to the serving base station 1340 using direct connection configuration information. The UE 1300 may perform an operation of releasing PC5 direct link and connection establishment and SLRB configuration for relay transmission with the previous serving sidelink relay that are no longer needed. The PC5 direct link and connection establishment and SLRB configuration, which should be used by the UE 1300 and the previous serving sidelink relay for separate sidelink direct data transmission and reception, not for relay transmission, may continue to be used without being released. The operation procedure performed by the UE 1300 with previous serving sidelink relay to release the PC5 direct link and connection establishment and SLRB configuration for relay transmission that are no longer needed is the same as the embodiment of FIG. 9 or FIG. 10. The previous serving sidelink relay may release RAP sublayer configuration information and PC5 SLRB configuration information configured for relay transmission of the UE 1300, and the operation procedures performed by the previous serving sidelink relay with the UE 1300 and the serving base station 1340 are as shown in FIGS. 9 and 10 and FIGS. 11A and 11B, respectively.

Next, scenarios in which a UE performs a sidelink relay change procedure to a neighboring base station other than a serving base station will be described with reference to FIGS. 14 and 15. The embodiment of FIG. 14 corresponds to a case where the UE changes a connection with a sidelink relay of a serving base station to a direct connection with a target base station. The embodiment of FIG. 15 corresponds to a case where the UE changes a connection with the sidelink relay of the serving base station to a connection with the sidelink relay of the target base station.

FIG. 14 is a diagram illustrating an operation sequence of a UE, a serving sidelink relay terminal, a serving base station, and a target base station that process connected mode mobility of a UE according to an embodiment of the disclosure.

With reference to FIG. 14, at step 1402, a UE 1400 may acquire, from a serving base station 1420, an RRCReconfiguration message including sidelink relay change configuration information indicating a direct connection to a target base station 1430 while performing data/signaling transmission and reception with the serving base station 1420 through a sidelink relay connection with a serving sidelink relay 1410. At step 1401, the serving base station 1420 and the target base station 1430 may perform a procedure for exchanging inter-node messages for the purpose of sidelink relay change so that the UE 1400 acquires configuration information necessary for establishment of the direct connection to the target base station 1430 in the RRCReconfiguration message at the step 1402. The inter-node messages of the step 1401 may be used for exchanging not only identification information of the UE 1400 and sidelink relay support capability information, but also random access configuration information, Uu RRC entity configuration information, Uu SDAP entity information, Uu PDCP entity information, Uu RLC entity information, Uu MAC entity information, Uu L1 (PHY) entity information, and the like that the UE 1400 can use in the direct connection with the target base station 1430. At step 1403, the UE 1400 may determine a need to connect to the target base station 1430 and perform an access procedure to the target base station 1430. The UE 1400 may process, for the target base station 1430, a synchronization acquisition procedure, a random access procedure (at least one or combination of contention-based, contention-free, 2-step RACH, and 4-step RACH), Uu RRC entity configuration, Uu SDAP entity configuration, Uu PDCP entity configuration, Uu RLC entity configuration, Uu MAC entity configuration, and Uu L1 (PHY) entity configuration information, and perform, with the target base station 1430, Uu RRC entity configuration, Uu SDAP entity configuration, Uu PDCP Entity configuration, Uu RLC entity configuration, Uu MAC entity configuration, and Uu L1 (PHY) entity configuration. At step 1404, the UE 1400 may transmit an RRCReconfigurationComplete message to the target base station 1430. For signaling/data relay transmission with the serving base station 1420, the UE 1400 may release the PC5 direct link establishment with the sidelink relay 1410. The PC5 direct link establishment release procedure for relay transmission performed by the UE 1400 and the sidelink relay 1410 is the same as the embodiment of FIG. 9 (the PC5 direct link establishment release procedure for relay transmission based on triggering of the UE) or FIG. 10 (the PC5 direct link establishment release procedure for relay transmission based on triggering of the sidelink relay). In the case of proceeding with the procedure of FIG. 10, the serving base station 1420 may transmit, to the sidelink relay 1410, an RRCReconfiguration message indicating no need of relay connection with the UE 1400 and indicating a release of RAP configuration for relay transmission with the UE 1400, a release of relay configuration for the UE 1400, and a release of sidelink configuration for relay transmission with the UE 1400. The embodiment in which the serving base station 1420 transmits the RRCReconfiguration message to the sidelink relay 1410 may include a case where the serving base station 1420 transmits the RRCReconfiguration message to the UE 1400 at the step 1402 and separately transmits the RRCReconfiguration message to the sidelink relay 1410 to notify relay configuration release, or a case where the UE 1400 transmits the RRCReconfigurationComplete message to the target base station 1430 at the step 1404, the target base station 1430 transmits an inter-node message to the serving base station 1420 to notify the completion of the handover and sidelink relay change procedure of the UE 1400, and the serving base station 1420 transmits the RRCReconfiguration message to the serving sidelink relay 1410 to notify relay configuration release.

FIG. 15 is a diagram illustrating an operation sequence of a UE, a serving sidelink relay terminal, a serving base station, and a target base station that process connected mode mobility of a UE according to an embodiment of the disclosure.

Referring to FIG. 15, at step 1502, a UE 1500 may acquire an RRCReconfiguration message including sidelink relay change configuration information indicating a connection to a sidelink relay 1550 of a target base station 1540, from a serving base station 1530 in the case of direct connection configuration with the serving base station 1530, or from a serving sidelink relay in the case of performing data/signaling transmission and reception with the serving base station 1530 through a sidelink relay connection with the serving sidelink relay. For the Uu configuration information with the target base station 1540 and the sidelink relay connection configuration information with the target sidelink relay 1550 for data/signaling transmission and reception with the target base station 1540 in the RRCReconfiguration message delivered to the UE 1500 at the step 1502, the serving base station 1530 and the target base station 1501 may perform a procedure for exchanging inter-node messages for sidelink relay change at step 1501. The inter-node messages of the step 1501 may be used for exchanging not only identification information of the UE 1500 and sidelink relay support capability information, but also Uu RRC entity configuration information, Uu SDAP entity information, and Uu PDCP entity information between the UE 1500 and the target base station 1540 and PC5 L1 (PHY) entity information, PC5 MAC entity information, and PC5 RLC entity information with the target sidelink relay 1550. At step 1503, the UE 1500 may determine a need for connection to the target base station 1540 and the target sidelink relay 1550 and perform an access procedure with the target base station 1540 and the target sidelink relay 1550. The target base station 1540 may notify, to the target sidelink relay 1550, a need of sidelink direct link establishment for relay with the UE 1500 through the RRCReconfiguration message of the step 1504 or the RRCReconfigurationComplete message of the step 1505 with the target sidelink relay 1550. In procedures of the steps 1504 and 1505, the target sidelink relay 1550 may acquire, from the target base station 1540, at least one or a combination of information of the UE 1500, relay configuration information necessary for relay transmission between the target base station 1540 and the UE 1500, and RAP sublayer configuration information.

For example, at step 1506, the UE 1500 may determine that a PC5 direct link establishment procedure with the target sidelink relay 1550 is necessary to establish a connection for data/signaling transmission and reception with the target base station 1540, and perform the PC5 direct link connection establishment procedure with the target sidelink relay 1550. By triggering of the UE 1500, the UE 1500 and the target sidelink relay 1550 may perform a PC5 direct link setup establishment procedure using PC5-S signaling of the V2X layer. The UE 1500 may set the PC5-S signaling protocol cause to "relay path switch" or "link setup for indirect communication" and transmit a direct link setup request PC5-S signaling to the target sidelink relay 1550. If the UE 1500 and the target sidelink relay 1550 have already performed the PC5 direct link setup establishment procedure for normal sidelink data transmission and reception, not for relay transmission, and maintain a PC5 direct link connection, the UE 1500 and the target sidelink relay 1550 may use the existing PC5 direct link connection for relay transmission. In this case, the UE 1500 may set the PC5-S signaling protocol cause to "relay path switch" or "link setup for indirect communication" and transmit direct link modification request PC5-S signaling to the target sidelink relay 1550. As another embodiment, in the case of using an already established PC5 direct link for relay between the UE 1500 and the target sidelink relay 1550, the UE 1500 may transmit, to the target sidelink relay 1550, PC5 RRC signaling (e.g., RRCReconfigurationSidelink) indicating a need of PC5 SLRB configuration for relay. In addition, at the step 15063, the UE 1500 and the target sidelink relay 1550 may also perform an SLRB configuration procedure using sidelink RRC signaling. As another embodiment, the UE 1500 and the target sidelink relay 1550 may not perform the sidelink SLRB configuration procedure at the step 1506, and instead may perform the sidelink SLRB configuration procedure after acquiring sidelink SLRB configuration information for relay from the target base station 1540.

Through the procedure of the step 1506, the target sidelink relay 1550 may determine that data/signaling needs to be relay-transmitted between the UE 1500 and the target base station 1540, and may acquire information of the UE 1500. At step 1508, the target sidelink relay 1550 may transmit, to the target base station 1540, a SidelinkUEInformation message reporting that relay transmission of the UE 1500 is needed. The SidelinkUEInformation message of the step 1508 may include at least one or a combination of identification information of the UE 1500, information indicating a need of SLRB configuration in relay transmission for the UE 1500, and sidelink transmission resource request information necessary for relay transmission for the UE 1500. The identification information of the UE 1500 used at the step 1508 may include the destination layer-2 ID of the UE 1500 or the unicast link ID of the UE 1500 and the target sidelink relay 1550, and the UE identification information may be used to distinguish the UE 1500 in a relay adaptation protocol (RAP) sublayer of the target base station 1540 and the target sidelink relay 1550. In the case of using the destination layer-2 ID as the identification information of the UE 1500, the destination layer-2 ID may be used in relay transmission through the UE 1500 and a previous serving sidelink relay. If it is determined that the destination layer-2 ID needs to be updated in the case of being connected with the target sidelink relay 1550, the UE 1500 may perform a destination layer-2 ID update procedure with the target sidelink relay 1550. At step 1509, the target base station 1540 may transmit relay configuration information required for data/signaling relay transmission between the UE 1500 and the target base station 1540 to the target sidelink relay 1550 and transmit RAP sublayer configuration information. When the target base station 1540 transmits the relay configuration information or the RAP sublayer configuration information to the target sidelink relay 1550, the identification information of the UE 1500 reported in the SidelinkUEInformation message of the step 1508 by the target sidelink relay 1550 may be contained. At step 1510, the target sidelink relay 1550 may transmit an RRCReconfigurationComplete message to the target base station 1540 as a response to the RRCReconfiguration message of the step 1509. In addition, the target base station 1540 may transmit sidelink SLRB configuration information for relay transmission to the target sidelink relay 1550 at the step 1509. At step 1511, the UE 1500 and the target sidelink relay 1550 may exchange PC5 RRC signaling for sidelink SLRB configuration information for relay transmission. The sidelink SLRB configuration information for relay transmission may include at least one or a combination of PC5 L1 (PHY)

entity configuration information, PC5 MAC entity configuration information, and PC5 RLC entity configuration information.

As another example, at the step 1506, the target sidelink relay 1550 may determine that a PC5 direct link establishment procedure with the UE 1500 is necessary to establish a connection for data/signaling transmission and reception between the target base station 1540 and the UE 1500, and perform the PC5 direct link connection establishment procedure with the UE 1500. By triggering of the target sidelink relay 1550, the target sidelink relay 1550 may perform the PC5 direct link connection establishment procedure with the UE 1500 at the step 1506. By triggering of the target sidelink relay 1550 receiving the RRCReconfiguration message at the step 1504, the UE 1500 and the target sidelink relay 1550 may perform a PC5 direct link setup establishment procedure using PC5-S signaling of the V2X layer. The target sidelink relay 1550 may set the PC5-S signaling protocol cause to "relay path switch" or "link setup for indirect communication" and transmit a direct link setup request PC5-S signaling to the UE 1500. If the UE 1500 and the target sidelink relay 1550 have already performed the PC5 direct link setup establishment procedure for normal sidelink data transmission and reception, not for relay transmission, and maintain a PC5 direct link connection, the UE 1500 and the target sidelink relay 1550 may use the existing PC5 direct link connection for relay transmission. In this case, the target sidelink relay 1550 may set the PC5-S signaling protocol cause to "relay path switch" or "link setup for indirect communication" and transmit direct link modification request PC5-S signaling to the UE 1500. As another embodiment, in the case of using an already established PC5 direct link for relay between the UE 1500 and the target sidelink relay 1550, the target sidelink relay 1550 may transmit, to the UE 1500, PC5 RRC signaling (e.g., RRCReconfigurationSidelink) indicating a need of PC5 SLRB configuration for relay. In addition, at the step 1506, the UE 1500 and the target sidelink relay 1550 may also perform an SLRB configuration procedure using sidelink RRC signaling. As another embodiment, the UE 1500 and the target sidelink relay 1550 may not perform the sidelink SLRB configuration procedure at the step 1506, and instead may perform the sidelink SLRB configuration procedure after acquiring sidelink SLRB configuration information for relay from the target base station 1540.

At step 1507, the target sidelink relay 1550 may determine a need of sidelink SLRB configuration information for relay transmission with the UE 1500, and at the step 1508, may transmit, to the target base station 1540, a SidelinkUEInformation message including at least one or a combination of a notification of PC5 direct link connection establishment for relay transmission with the UE 1500, a notification of a need for PC5 SLRB configuration for relay transmission with the UE 1500, sidelink transmission resource request information required for relay transmission to the UE 1500, and a notification of identification information of the UE 1500. The identification information of the UE 1500 used at the step 1508 may include the destination layer-2 ID of the UE 1500 or the unicast link ID of the UE 1500 and the target sidelink relay 1550, and the UE identification information may be used to distinguish the UE 1500 in a relay adaptation protocol (RAP) sublayer of the target base station 1540 and the target sidelink relay 1550. In the case of using the destination layer-2 ID as the identification information of the UE 1500, the destination layer-2 ID may be used in relay transmission through the UE 1500 and a previous serving sidelink relay. If it is determined that the destination layer-2 ID needs to be updated in the case of being connected with the target sidelink relay 1550, the UE 1500 may perform a destination layer-2 ID update procedure with the target sidelink relay 1550. Upon receiving the SidelinkUEInformation message including a sidelink relay connection establishment report, information about the UE 1500 connected to the target sidelink relay 1550 for sidelink relay connection, or the like from the target sidelink relay 1550 at the step 1508, the target base station 1540 may determine whether the target sidelink relay 1550 and the UE 1500 need the PC5 SLRB configuration information for sidelink relay transmission. At the step 1509, the target base station 1540 may transmit relay configuration information required for data/signaling relay transmission between the UE 1500 and the target base station 1540 to the target sidelink relay 1550 and transmit RAP sublayer configuration information. When the target base station 1540 transmits the relay configuration information or the RAP sublayer configuration information to the target sidelink relay 1550, the identification information of the UE 1500 reported in the SidelinkUEInformation message of the step 1508 by the target sidelink relay 1550 may be contained. At the step 1510, the target sidelink relay 1550 may transmit an RRCReconfigurationComplete message to the target base station 1540 as a response to the RRCReconfiguration message of the step 1509. In addition, the target base station 1540 may transmit sidelink SLRB configuration information for relay transmission to the target sidelink relay 1550 at the step 1509. At the step 1511, the UE 1500 and the target sidelink relay 1550 may exchange PC5 RRC signaling for sidelink SLRB configuration information for relay transmission. The sidelink SLRB configuration information for relay transmission may include at least one or a combination of PC5 L1 (PHY) entity configuration information, PC5 MAC entity configuration information, and PC5 RLC entity configuration information.

In addition, the UE 1500 may process Uu RRC entity configuration, Uu SDAP entity configuration, and Uu PDCP entity configuration information with the target base station 1540, and perform Uu RRC entity configuration, Uu SDAP entity configuration, and Uu PDCP entity configuration with the target base station 1540. When the configuration of PC5 L1 (PHY) entity, PC5 MAC entity, and PC5 RLC entity is completed through sidelink SLRB configuration for relay transmission between the UE 1500 and the target sidelink relay 1550 and the configuration of Uu RRC entity, Uu SDAP entity, and Uu PDCP entity with the target base station 1540 is completed, the UE 1500 may transmit the RRCReconfigurationComplete message to the target base station 1540 through the target sidelink relay 1550 at step 1512 for the purpose of reporting the completion of handover and sidelink relay change.

In the case of performing the sidelink relay change procedure from connection with the serving sidelink relay to connection with the target sidelink relay 1550, the UE 1500 may release the PC5 direct link established with the sidelink relay for signaling/data relay transmission with the serving base station 1530. The PC5 direct link establishment release procedure for relay transmission performed by the UE 1500 and the sidelink relay is the same as the embodiment of FIG. 9 (the PC5 direct link establishment release procedure for relay transmission based on triggering of the UE) or FIG. 10 (the PC5 direct link establishment release procedure for relay transmission based on triggering of the sidelink relay). In the case of proceeding with the procedure of FIG. 10, the serving base station 1530 may transmit, to the sidelink relay, an RRCReconfiguration message indicating no need of relay connection with the UE 1500 and indicating a release of RAP configuration for relay transmission with the UE 1500, a release of relay configuration for the UE 1500, and a release of sidelink configuration for relay transmission with the UE 1500. The embodiment in which the serving base station 1530 transmits the RRCReconfiguration message to the sidelink relay may include a case where the serving base station 1530 transmits the RRCReconfiguration message to the UE 1500 at the step 1502 and separately transmits the RRCReconfiguration message to the sidelink relay to notify relay configuration release, or a case where the UE 1500 transmits the RRCReconfigurationComplete message to the target base station 1540 at the step 1512, the target base station 1540 transmits an inter-node message to the serving base station 1530 to notify the completion of the handover and sidelink relay change procedure of the UE 1500, and the serving base station 1530 transmits the RRCReconfiguration message to the serving sidelink relay to notify relay configuration release.

In the case of performing handover to change a serving cell (e.g., changing a connection to a target cell according to RRCReconfiguration with sync), the UE may perform PDCP entity reestablishment and RLC entity reestablishment with the target cell. According to various embodiments of the disclosure, a scheme in which the UE processes a PDCP entity and an RLC entity with a target base station or a target sidelink relay when the UE changes from a direct connection with a base station to a connection to a sidelink relay or when the UE changes from a connection with a sidelink relay to a direct connection with a base station will be described.

In the case where the UE is directly connected to the base station, the UE may configure the Uu SDAP entity and the Uu PDCP entity with the base station, and may configure the Uu RLC entity and the Uu MAC entity with the base station. In the case where the UE is connected to the base station through the sidelink relay, the UE may configure the Uu SDAP entity and the Uu PDCP entity with the base station, and may configure the PC5 RLC entity and the PC5 MAC entity with the sidelink relay. For example, when the UE changes a path from the direct connection with the base station to the connection with the sidelink relay, the UE may maintain the Uu SDAP entity and the Uu PDCP entity with the base station, but may configure the PC5 RLC entity and the PC5 MAC entity with sidelink relay instead of the Uu RLC entity and the Uu MAC entity with the base station. For example, when the UE changes a path from the connection with the base station through the sidelink relay to the direct connection with the base station, the UE may maintain the Uu SDAP entity and the Uu PDCP entity with the base station, but may configure the Uu RLC entity and the Uu MAC entity with the base station instead of the PC5 RLC and the PC5 MAC entity with the sidelink relay. For example, when the UE changes a path from the direct connection with the base station A or the connection through the sidelink relay connected to the base station A to the direct connection with the base station B or the connection through the sidelink relay connected to the base station B, the UE may configure (1) the Uu SDAP entity and the Uu PDCP entity for the base station B and configure the Uu RLC entity and the Uu MAC entity for the base station B, or configure (2) the Uu SDAP entity and the Uu PDCP entity for the base station B and configure the Uu RLC entity and the Uu MAC entity with the sidelink relay connected to the base station B.

A scheme for the UE to process the Uu PDCP entity, the Uu RLC entity, the Uu MAC entity, the PC5 RLC entity, and the PC5 MAC entity according to a path change configuration message will be described.

In one embodiment, in the case where the UE acquires a path change configuration message indicating the connection with the sidelink relay from the direct connection with the base station, or the UE acquires a path change configuration message indicating the direct connection with the base station from the connection with the sidelink relay, the path change configuration message may include configuration information for the UE to process at least one or a combination of the Uu PDCP entity, the Uu RLC entity, the Uu MAC entity, the PC5 RLC entity, and the PC5 MAC entity, as follows.

(A) In the Case where the UE Performs a Path Change within the Same Base Station When the UE performs the direct connection with the base station from the connection with the sidelink relay, random access processing with PCell/PScell, Uu MAC reset configuration or Uu MAC configuration, Uu RLC establishment (including a PC5 logical channel and a Uu logical channel mapped thereto) configuration, and PDCP data recovery (RLC AM mode DRB only) configuration may be indicated by a layer-2 indicator. When the UE performs the direct connection with the base station from the connection with the sidelink relay, PC5 MAC reset configuration and PC5 RLC entity release configuration (including a PC5 logical channel and a Uu logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the connection with the sidelink relay to the direct connection with the base station.

When the UE performs the connection with the sidelink relay from the direct connection with the base station, Uu MAC reset configuration, Uu RLC release configuration (including a PC5 logical channel and a Uu logical channel mapped thereto), and PDCP data recovery (RLC AM mode DRB only) configuration may be indicated by the layer-2 indicator. When the UE performs the connection with the sidelink relay from the direct connection with the base station, PC5 MAC reset configuration and PC5 RLC establishment configuration (including a PC5 logical channel and a Uu logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the direct connection with the base station to the connection with the sidelink relay.

In another embodiment, in the case where the UE acquires a path change configuration message indicating the connection with the sidelink relay from the direct connection with the base station, or acquires a path change configuration message indicating the direct connection with the base station from the connection with the sidelink relay, the path change configuration message may include configuration information for the UE to process at least one or a combination of the Uu PDCP entity, the Uu RLC entity, the Uu MAC entity, the PC5 RLC entity, and the PC5 MAC entity, as follows.

When the UE performs the direct connection with the base station from the connection with the sidelink relay, random access processing with PCell/PScell, Uu MAC reset configuration or Uu MAC configuration, Uu RLC establishment (including a PC5 logical channel and a Uu logical channel mapped thereto) configuration, and Uu PDCP reestablishment with key refresh (when the base station determines that a security key to be used in the Uu PDCP needs to be changed) configuration may be indicated by a layer-2 indicator. When the UE performs the direct connection with the base station from the connection with the sidelink relay, PC5 MAC reset configuration and PC5 RLC entity release configuration (including a PC5 logical channel and a Uu logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the connection with the sidelink relay to the direct connection with the base station.

When the UE performs the connection with the sidelink relay from the direct connection with the base station, Uu MAC reset configuration, Uu RLC release configuration (including a PC5 logical channel and a Uu logical channel mapped thereto), and Uu PDCP reestablishment with key refresh (when the base station determines that a security key to be used in the Uu PDCP needs to be changed) configuration may be indicated by the layer-2 indicator. When the UE performs the connection with the sidelink relay from the direct connection with the base station, PC5 MAC reset configuration and PC5 RLC establishment configuration (including a PC5 logical channel and a Uu logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the direct connection with the base station to the connection with the sidelink relay.

(B) In the Case where the UE Performs a Path Change from a Base Station A to a Base Station B When the UE performs the direct connection with the base station B from the connection with the sidelink relay in the base station A, random access processing with PCell/PScell, Uu MAC reset configuration or Uu MAC configuration, Uu RLC establishment (including a PC5 logical channel and a Uu logical channel mapped thereto) configuration, and Uu PDCP reestablishment with key refresh configuration may be indicated by a layer-2 indicator. When the UE performs the direct connection with the base station B from the connection with the sidelink relay in the base station A, PC5 MAC reset configuration or PC5 MAC release configuration, and PC5 RLC entity release configuration (including a PC5 logical channel and a Uu logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the connection with the sidelink relay in the base station A to the direct connection with the base station B.

When the UE performs the connection with the sidelink relay in the base station B from the direct connection with the base station A, Uu MAC reset configuration, Uu RLC release configuration (including a PC5 logical channel and a Uu logical channel mapped thereto), and Uu PDCP reestablishment with key refresh configuration may be indicated by the layer-2 indicator. When the UE performs the connection with the sidelink relay in the base station B from the direct connection with the base station A, PC5 MAC reset configuration or PC5 MAC release configuration, and PC5 RLC establishment configuration (including a PC5 logical channel and a Uu logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the direct connection with the base station A to the connection with the sidelink relay in the base station B.

In another embodiment, in the case where the UE acquires a path change configuration message indicating the connection with the sidelink relay connected to the base station B from the direct connection with the base station A, or acquires a path change configuration message indicating the direct connection with the base station B from the connection with the sidelink relay in the base station A, the path change configuration message may include configuration information for the UE to process at least one or a combination of the Uu PDCP entity, the Uu RLC entity, the Uu MAC entity, the PC5 RLC entity, and the PC5 MAC entity, as follows.

When the UE performs the direct connection with the base station B from the connection with the sidelink relay in the base station A, random access processing with PCell/PScell, Uu MAC reset configuration or Uu MAC configuration, Uu RLC establishment (including a PC5 logical channel and a Uu logical channel mapped thereto) configuration, and Uu PDCP reestablishment with key refresh configuration may be indicated by a layer-2 indicator. When the UE performs the direct connection with the base station B from the connection with the sidelink relay in the base station A, PC5 MAC reset configuration or PC5 MAC release configuration, and PC5 RLC entity release configuration (including a PC5 logical channel and a Uu logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the connection with the sidelink relay in the base station A to the direct connection with the base station B.

When the UE performs the connection with the sidelink relay in the base station B from the direct connection with the base station A, Uu MAC reset configuration, Uu RLC release configuration (including a PC5 logical channel and a Uu logical channel mapped thereto), and Uu PDCP reestablishment with key refresh configuration may be indicated by the layer-2 indicator. When the UE performs the connection with the sidelink relay in the base station B from the direct connection with the base station A, PC5 MAC reset configuration and PC5 RLC establishment configuration (including a PC5 logical channel and a Uu logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the direct connection with the base station A to the connection with the sidelink relay in the base station B.

In one embodiment, when the UE performs the connection with the sidelink relay in the base station B from the connection with the sidelink relay in the base station A, Uu MAC reset configuration, Uu RLC reestablishment (including a Uu logical channel and a PC5 logical channel mapped thereto) configuration, and Uu PDCP reestablishment with key refresh configuration may be indicated by a layer-2 indicator. When the UE performs the connection with the sidelink relay in the base station B from the connection with the sidelink relay in the base station A, PC5 MAC reset configuration and PC5 RLC reestablishment configuration (including a Uu logical channel and a PC5 logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the connection with the sidelink relay in the base station A to the connection with the sidelink relay in the base station B.

In another embodiment, when the UE performs the connection with the sidelink relay in the base station B from the connection with the sidelink relay in the base station A, Uu PDCP reestablishment with key refresh configuration may be indicated by a layer-2 indicator. When the UE performs the connection with the sidelink relay in the base station B from the connection with the sidelink relay in the base station A, PC5 MAC reset configuration and PC5 RLC reestablishment configuration (including a Uu logical channel and a PC5 logical channel mapped thereto) may be indicated by the layer-2 indicator. The UE may process the Uu PDCP entity, the Uu RLC entity, the Uu MAC entity, the PC5 RLC entity, and the PC5 MAC entity based on the indication of the configuration information while changing from the connection with the sidelink relay in the base station A to the connection with the sidelink relay in the base station B.

When the UE changes a path from the direct connection with the base station to the sidelink relay or from the connection with the sidelink relay to the direct connection with the base station, the Uu PDCP entity with the base station configured by the UE may not need to update the security key used in the PDCP layer and does not need to perform a security key refresh operation, and the Uu PDCP entity may perform an operation to perform recovery processing on PDCP data and thereby recover loss of a PDCP PDU that may occur during a path change. In this case, when the UE obtains a path change indication message indicating the connection with the sidelink relay from the direct connection with the base station, or when the UE obtains a path change indication message indicating the direct connection with the base station from the connection with the sidelink relay, and when PDCP data recovery of the PDCP entity is configured in such a path change indication message, an operation for the UE to process PDCP data PDU retransmission is as follows.

If it is determined that statusReportRequired is set to be enabled in the RRC configuration message including data radio bearer (DRB) configuration, the UE may transmit a PDCP status report message to the base station in the case of a path change from the direct connection with the base station to the connection with the sidelink relay or in the case of a path change from the connection with the sidelink relay to the direct connection with the base station for an RLC AM mode DRB with statusReportRequired set to be enabled. The PDCP status report message may include information on a downlink PDCP data PDU received by the UE from the base station. In addition, for the RLC AM mode DRB in which statusReportRequired is set to be enabled in the RRC configuration message including the DRB configuration, the UE may receive the PDCP status report message from the base station, and this PDCP status report message may contain information on uplink PDCP data PDU transmitted by the UE to the base station. The UE may delete the PDCP data PDU indicated to be transmitted without errors according to information of the received PDCP status report message, and may retransmit the PDCP data PDU indicated to have not been properly transmitted. That is, when the UE changes from the connection with the sidelink relay to the direct connection with the base station, the UE may retransmit the PDCP data PDU that was not successfully delivered, by referring to the COUNT value of the PDCP data PDU indicated as unsuccessfully delivered in the PDCP status report message among the PDCP data PDUs transmitted by the PC5 RLC entity in the released AM mode. Alternatively, when the UE changes from the direct connection with the base station to the connection with the sidelink relay, the UE may retransmit the PDCP data PDU that was not successfully delivered, by referring to the COUNT value of the PDCP data PDU indicated as unsuccessfully delivered in the PDCP status report message among the PDCP data PDUs transmitted by the Uu RLC entity in the released AM mode The methods according to embodiments set forth in claims or specification of the disclosure may be implemented in the form of hardware, software, or a combination thereof.

When implemented in software, a computer readable storage medium storing one or more programs (software modules) may be provided. One or more programs stored in the computer readable storage medium are configured for execution by one or more processors in an electronic device. One or more programs include instructions for causing an electronic device to execute methods according to embodiments described in claims or specifications of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other types of optical storage devices, or magnetic cassettes. Alternatively, such programs may be stored in a memory configured with a combination of some or all thereof. Further, each configuration memory may be included in the plural.

Further, the program may be stored in an attachable storage device that may access through a communication network such as Internet, Intranet, a local area network (LAN), a wide area network (WAN), or a storage area network (SAN), or a communication network configured with a combination thereof. Such a storage device may access to a device implementing an embodiment of the disclosure through an external port. Further, a separate storage device on the communication network may access to the device implementing the embodiment of the disclosure.

In the specific embodiments of the disclosure described above, components included in the disclosure are expressed in the singular or the plural according to the presented specific embodiments. However, the singular or plural expression is appropriately selected for the presented situation for convenience of description, and the disclosure is not limited to the singular or plural components, and even if the component is expressed in the plural, the component may be configured with the singular, or even if the component is expressed in the singular, the component may be configured with the plural.

Although specific embodiments have been described in the detailed description of the disclosure, various modifications are possible without departing from the scope of the disclosure. Therefore, the scope of the disclosure should not be limited to the described embodiments and should be defined by claims set forth below as well as equivalents to claims.

The invention claimed is:

1. A method performed by a terminal in a wireless communication system, the method comprising:
   receiving, from a base station, measurement configuration information;
   transmitting, to the base station, a measurement report including a first measurement result associated with at least one neighboring cell and a second measurement result associated with a sidelink relay terminal;
   receiving, from the base station, a first message including configuration information related with a path switch between a direct path and an indirect path;
   establishing a PC5 radio resource control (RRC) connection with a target relay terminal based on the first message; and
   transmitting, to the base station via the target relay terminal, a second message,
   wherein the second measurement result includes an identifier of the sidelink relay terminal, an identifier of a serving cell of the sidelink relay terminal, and a sidelink measurement result of the sidelink relay terminal.

2. The method of claim 1, wherein the first message includes at least one of an identity of the target relay terminal, configuration information on a PC5 radio link control (RLC) channel for relay traffic, and information on a bearer.

3. The method of claim 1, wherein the measurement configuration information includes information on the at least one neighboring cell and at least one candidate sidelink relay terminal.

4. The method of claim 1,
   wherein the second message is for completing a path switching procedure.

5. The method of claim 1, further comprising:
   receiving, from the base station, a third message including configuration information related with a path switch between the indirect path and the direct path;
   performing a random access procedure to the base station; and
   releasing the PC5 RRC connection after receiving the third message from the base station.

6. A method performed by a base station in a wireless communication system, the method comprising:
   transmitting, to a terminal, measurement configuration information;
   receiving, from the terminal, a measurement report including a first measurement result associated with at least one neighboring cell and a second measurement result associated with a sidelink relay terminal;
   identifying to switch the terminal to an indirect path via a target relay terminal;
   transmitting, to the target relay terminal, a first message including configuration information on a relay operation of the target relay terminal;
   transmitting, to the terminal, a second message including configuration information related with a path switch between a direct path and the indirect path; and
   receiving, from the terminal via the target relay terminal, a third message,
   wherein the second measurement result includes an identifier of the sidelink relay terminal, an identifier of a serving cell of the sidelink relay terminal, and a sidelink measurement result of the sidelink relay terminal.

7. The method of claim 6, wherein the second message includes at least one of an identity of the target relay terminal, configuration information on a PC5 radio link control (RLC) channel for relay traffic, or information on a bearer, and
   wherein the first message includes at least one of an identity of the terminal, configuration information on the PC5 RLC channel for relay traffic, information on the bearer, or configuration information on a Uu RLC channel.

8. The method of claim 6, wherein the measurement configuration information includes information on the at least one neighboring cell and at least one candidate sidelink relay terminal.

9. The method of claim 6, wherein the third message is for completing a path switching procedure.

10. The method of claim 6, further comprising:

transmitting, to the terminal, a fourth message including configuration information related with a path switch between the indirect path and the direct path;

performing a random access procedure with the terminal; and transmitting, to the target relay terminal, a fifth message including configuration information for releasing a PC5 RLC channel for relay traffic, a Uu RLC channel, or a bearer related to the terminal.

11. A terminal in a wireless communication system, the terminal comprising:

a transceiver; and a controller coupled with the transceiver and configured to:

receive, from a base station, measurement configuration information, transmit, to the base station, a measurement report including a first measurement result associated with at least one neighboring cell and a second measurement result associated with a sidelink relay terminal, receive, from the base station, a first message including configuration information related with a path switch between a direct path and an indirect path, establish a PC5 radio resource control (RRC) connection with a target relay terminal based on the first message, and transmit, to the base station via the target relay terminal, a second message, wherein the second measurement result includes an identifier of the sidelink relay terminal, an identifier of a serving cell of the sidelink relay terminal, and a sidelink measurement result of the sidelink relay terminal.

12. The terminal of claim 11, wherein the first message includes at least one of an identity of the target relay terminal, configuration information on a PC5 radio link control (RLC) channel for relay traffic, and information on a bearer.

13. The terminal of claim 11, wherein the measurement configuration information includes information on the at least one neighboring cell and at least one candidate sidelink relay terminal.

14. The terminal of claim 11, wherein the second message is for completing a path switching procedure.

15. The terminal of claim 11, wherein the controller is further configured to:

receive, from the base station, a third message including configuration information related with a path switch between the indirect path and the direct path;

perform a random access procedure to the base station; and release the PC5 RRC connection after receiving the third message from the base station.

16. A base station in a wireless communication system, the base station comprising:

a transceiver; and a controller coupled with the transceiver and configured to:

transmit, to a terminal, measurement configuration information, receive, from the terminal, a measurement report including a first measurement result associated with at least one neighboring cell and a second measurement result associated with a sidelink relay terminal, and identify to switch the terminal to an indirect path via a target relay terminal, transmit, to the target relay terminal, a first message including configuration information on a relay operation of the target relay terminal, transmit, to the terminal, a second message including configuration information related with a path switch between a direct path and the indirect path; and receive, from the terminal via the target relay terminal, a third message, wherein the second measurement result includes an identifier of the sidelink relay terminal, an identifier of a serving cell of the sidelink relay terminal, and a sidelink measurement result of the sidelink relay terminal.

17. The base station of claim 16, wherein the second message includes at least one of an identity of the target relay terminal, configuration information on a PC5 radio link control (RLC) channel for relay traffic, or information on a bearer, and wherein the first message includes at least one of an identity of the terminal, configuration information on the PC5 RLC channel for relay traffic, information on the bearer, or configuration information on a Uu RLC channel.

18. The base station of claim 16, wherein the measurement configuration information includes information on the at least one neighboring cell and at least one candidate sidelink relay terminal.

19. The base station of claim 16, wherein the third message is for completing a path switching procedure.

20. The base station of claim 16, wherein the controller is further configured to:

transmit, to the terminal, a fourth message including configuration information related with a path switch between the indirect path and the direct path, perform a random access procedure with the terminal, and transmit, to the target relay terminal, a fifth message including configuration information for releasing a PC5 RLC channel for relay traffic, a Uu RLC channel, or a bearer related to the terminal.

* * * * *